US009124357B2

(12) United States Patent
Jia et al.

(10) Patent No.: US 9,124,357 B2
(45) Date of Patent: Sep. 1, 2015

(54) MEDIA ACCESS CONTROL FOR ULTRA-WIDE BAND COMMUNICATION

(75) Inventors: Zhanfeng Jia, Belmont, CA (US); Chong U. Lee, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 723 days.

(21) Appl. No.: 11/620,021

(22) Filed: Jan. 4, 2007

(65) Prior Publication Data

US 2007/0248114 A1    Oct. 25, 2007

Related U.S. Application Data

(60) Provisional application No. 60/794,030, filed on Apr. 20, 2006, provisional application No. 60/795,980, filed on Apr. 28, 2006.

(51) Int. Cl.
| | |
|---|---|
| *H04J 3/16* | (2006.01) |
| *H04B 1/7163* | (2011.01) |
| *H04B 1/69* | (2011.01) |
| *H04W 84/18* | (2009.01) |

(52) U.S. Cl.
CPC .... *H04B 1/71632* (2013.01); *H04B 2001/6908* (2013.01); *H04W 84/18* (2013.01)

(58) Field of Classification Search
USPC ......... 370/203–205, 343, 329, 330, 349, 350, 370/480
See application file for complete search history.

(56) References Cited

U.S. PATENT DOCUMENTS

| | | | |
|---|---|---|---|
| 5,687,169 | A | 11/1997 | Fullerton |
| 5,764,696 | A | 6/1998 | Barnes et al. |
| 5,812,081 | A | 9/1998 | Fullerton |
| 5,832,035 | A | 11/1998 | Fullerton |
| 5,907,427 | A | 5/1999 | Scalora et al. |
| 5,952,956 | A | 9/1999 | Fullerton |
| 5,960,031 | A | 9/1999 | Fullerton et al. |
| 5,963,581 | A | 10/1999 | Fullerton et al. |
| 5,969,663 | A | 10/1999 | Fullerton et al. |

(Continued)

FOREIGN PATENT DOCUMENTS

| | | | |
|---|---|---|---|
| CN | 1614904 A | 5/2005 | |
| CN | 1652522 A | 8/2005 | |

(Continued)

OTHER PUBLICATIONS

R A Scholtz, Multiple Access with Time-Hopping Impulse Modulation, Military Conference, 1993, Bedford, MA Oct. 11-14, 1993.*

(Continued)

*Primary Examiner* — Jung-Jen Liu
(74) *Attorney, Agent, or Firm* — Paul S. Holdaway

(57) ABSTRACT

Media access control is provided for an ultra-wide band medium. The media access control may employ a peer-to-peer network topology. The media access control may employ a reduced addressing scheme. Concurrent ultra-wide band channels may be established through the use of a pulse division multiple access channelization scheme. Multiple media access control states may be defined whereby each state may be associated with one or more of different channel parameter state information, different duty cycles, and different synchronization status.

67 Claims, 13 Drawing Sheets

(56) References Cited

U.S. PATENT DOCUMENTS

| | | |
|---|---|---|
| 5,995,534 A | 11/1999 | Fullerton et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,952,456 B1 * | 10/2005 | Aiello et al. .................. 375/295 |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,088,795 B1 * | 8/2006 | Aiello et al. .................. 375/356 |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,233,804 B2 * | 6/2007 | Sugaya et al. ................ 455/501 |
| 7,239,277 B2 | 7/2007 | Fullerton et al. |
| 7,245,947 B2 | 7/2007 | Salokannel et al. |
| RE39,759 E | 8/2007 | Fullerton |
| 7,256,727 B2 | 8/2007 | Fullerton et al. |
| 7,271,779 B2 | 9/2007 | Hertel |
| 7,277,852 B2 * | 10/2007 | Iyoku et al. .................. 704/236 |
| 2002/0034191 A1 * | 3/2002 | Shattil ............................ 370/464 |
| 2002/0190786 A1 * | 12/2002 | Yoon et al. .................... 329/313 |
| 2003/0043931 A1 * | 3/2003 | Fullerton et al. ............. 375/295 |
| 2003/0043934 A1 * | 3/2003 | Roberts ......................... 375/316 |
| 2004/0008617 A1 * | 1/2004 | Dabak et al. .................. 370/208 |
| 2004/0057500 A1 * | 3/2004 | Balachandran et al. ....... 375/138 |
| 2004/0140918 A1 * | 7/2004 | Moore ............................ 341/58 |
| 2004/0223556 A1 * | 11/2004 | Choi .............................. 375/295 |
| 2005/0013345 A1 * | 1/2005 | Choi .............................. 375/130 |
| 2005/0047367 A1 * | 3/2005 | Lakkis .......................... 370/329 |
| 2005/0090200 A1 * | 4/2005 | Karaoguz et al. ............ 455/41.2 |
| 2005/0152329 A1 | 7/2005 | Krishnan et al. |
| 2005/0210157 A1 * | 9/2005 | Sakoda ......................... 709/251 |
| 2005/0238015 A1 | 10/2005 | Jurgensen et al. |

(56) References Cited

U.S. PATENT DOCUMENTS

| | | |
|---|---|---|
| 2006/0014537 A1 | 1/2006 | Arai et al. |
| 2007/0025739 A1* | 2/2007 | Moore et al. ............... 398/202 |
| 2008/0165746 A1* | 7/2008 | Sung et al. ............... 370/337 |

FOREIGN PATENT DOCUMENTS

| | | |
|---|---|---|
| GB | 2428919 A | 2/2007 |
| JP | 2005253047 A | 9/2005 |
| JP | 2005312052 A | 11/2005 |
| JP | 2006013594 A | 1/2006 |
| JP | 2006050396 | 2/2006 |
| JP | 2007518364 T | 7/2007 |
| WO | WO2004073218 A2 | 8/2004 |
| WO | 2005091572 A1 | 9/2005 |
| WO | WO2005081412 A2 | 9/2005 |

OTHER PUBLICATIONS

L L Yang, Residue Number System Assisted Fast Frequency Hopping Synchronous Ultra Wideband Spread Spectrum Multiple Access: A Design Alternative to Impulse Radio, IEEE Journal on selected areas in communications, vol. 20, No. 9, Dec. 2002.*

IEEE Std 802.15.4a—2007 (Amendment to IEEE Std 802.15.4—2006), Part 15.4: Wireless Medium Access Control (MAC) and Physical Layer (PHY) Specifications for Low-Rate Wireless Personal Area Networks (WPANs), Amendment 1. Add Alternate PHYs.

International Search Report—PCT/US07/067025, International Search Authority—European Patent Office, Mar. 1, 2008.

Written Opinion—PCT/US07/067025, International Search Authority—European Patent Office, Jan. 3, 2008.

International Preliminary Report on Patentability—PCT/US07/067025—International Search Authority, European Patent Office—Sep. 11, 2008.

Taiwanese Search report—096114087—TIPO—Aug. 10, 2010.

* cited by examiner

MEDIA ACCESS CONTROL FOR ULTRA-WIDE BAND COMMUNICATION

CLAIM PRIORITY UNDER 35 U.S.C. §119

This application claims the benefit of and priority to U.S. Provisional Patent Application No. 60/794,030, filed Apr. 20, 2006, and U.S. Provisional Patent Application No. 60/795,980, filed Apr. 28, 2006, each of which is assigned to the assignee hereof, and the disclosure of each of which is hereby incorporated by reference herein.

BACKGROUND

1. Field

This application relates generally to communications, and more specifically, to media access control for ultra-wide band communication.

2. Background

In a wireless communication system multiple wireless devices may communicate with one another via signals having frequencies within a given radio frequency band. Here, provisions may be made to prevent transmissions from one device from interfering with transmissions from another device. For example, some systems employ media access control that allows only one device to use a given medium (e.g., a radio frequency band) at a time. One way of accomplishing this is to enable each device to check the medium to determine whether another device is currently transmitting over the medium. If the medium is in use, the device will delay transmitting until a later time when the medium is not in use. Alternatively, some systems use a signaling technique such as spread spectrum that modifies transmitted signals to reduce the likelihood of transmissions from one device interfering with simultaneous transmissions of another device within the same frequency band.

Techniques such as these may be employed in a variety of wireless communication systems. An example of such a wireless communication system is an ultra-wide band system. Ultra-wide band technology may be used, for example, in personal area network ("PAN") or body area network ("BAN") applications.

At least one access scheme has been proposed for use in ultra-wide band systems. For example, IEEE 802.15.4a proposes a channel access scheme for achieving a low duty cycle in an ultra-wide band-based wireless PAN. This proposal specifies the use of a superframe structure that is defined by a central personal area network coordinator. The superframe structure begins with a beacon and contains a slotted contention access period ("CAP") and a slotted contention free period ("CFP"). For the CAP, it is assumed that a random channel access scheme such as Aloha or carrier sense multiple access ("CSMA") is employed. The PAN coordinator assigns the CFP slots. A data frame in every slot starts with a preamble sequence for the receiver to achieve channel acquisition. An additional inactive portion of superframe may further reduce the duty cycle.

An access scheme for some wireless PAN or BAN applications may need to support a variety of device with significantly different requirements. For example, for some devices it is important to consume as little power as possible. In addition, a given device in a network or different devices in a network may support a wide range of data rates. Consequently, the access scheme may need to provide relatively robust, yet flexible, functionality.

SUMMARY

A summary of selected aspects of the disclosure follows. For convenience, these and other aspects of the disclosure may be referred to herein simply as "an aspect" or "aspects."

In some aspects media access control is provided for an ultra-wide band communication. Here, access to a communication medium may be gained via one or more channels that employ ultra-wide band pulses. For example, the pulses for a given channel may be of relatively short duration and generated at a relatively low duty cycle. In some aspects media access control may employ one or more of a network topology scheme, an addressing scheme, a channelization scheme, and media access control states.

In some aspects media access control supports a peer-to-peer network topology. For example, each device communicating via one or more channels of a network may employ the same or substantially equivalent media access control functionality. Moreover, any set of peer devices may set up and communicate via one or more channels without employing or cooperating with a coordinator, a central controller, or some other similar component or functionality. In some aspects a channelization scheme may be employed to eliminate or reduce interference between concurrently operating channels established by peer devices.

In some aspects media access control employs a reduced addressing scheme. For example, a set of devices (e.g., peers) may cooperate to use either a shorter network address or no network address in conjunction with messages sent over a channel. In some aspects a shorter source network address (e.g., based on an address of a transmitter) may be sent over a channel. In some aspects a shorter destination network address (e.g., based on an address of a receiver) may be sent over a channel. In some aspects a channelization scheme may uniquely define a channel thereby eliminating (e.g., for certain types of traffic) the need for a source address, a destination address, or source and destination addresses. In some aspects a source address, a destination network address, or source and destination addresses, may not be employed in a streaming channel that continuously or relatively continuously transmits data.

In some aspects concurrent ultra-wide band channels may be established through the use of a pulse division multiple access channelization scheme. For example, orthogonal or pseudo orthogonal channels may be defined by controlling the timing or sequencing of pulses of the channels. In some aspects a channel may be defined in terms of one or more parameters such as a pulse repetition frequency, a pulse offset, a time hopping sequence, or a spreading pseudorandom noise sequence parameter. In addition, one or more of these parameters may be derived based on one or more unique parameters relating to the channel such as an address of a device that establishes the channel, a channel number, a sequence number, or a security key. In some aspects one or more of a timeslot structure, logical channels, a packet channel, or a streaming channel may be defined for a given channel.

In some aspects multiple media access control states are defined whereby each state may be associated with different channel parameter state information, a different duty cycle, a different synchronization status, or some combination of these parameters. For example, in some states a given device may maintain information relating to a given channel (e.g., a device address of another device that uses the channel), while in other states the device may maintain more or less channel-related information. In some states data may be transmitted and received more frequently than in other states. In some states devices on a channel may be synchronized while in other states the devices may not be synchronized. Such a state-based media access control scheme may advantageously provide a desired tradeoff between low power consumption and an ability to support various types of data, data rates, and latency requirements.

In some aspects state-based media access control employs a standby state and an active state. For example, in the standby state no active data transmissions may occur. Rather, the devices may only perform limited signaling, as necessary, to enable transition to the active state. Hence, this state may be a state of low duty cycle and/or a state of low or no synchronization. In the active state, a receiver may expect data transmissions. Thus, the receiver may continually or regularly scan for data. This state may be a state of higher duty cycle and/or a synchronized state.

BRIEF DESCRIPTION OF THE DRAWINGS

These and other features, aspects and advantages of the disclosure will be more fully understood when considered with respect to the following detailed description, appended claims and accompanying drawings, wherein:

FIG. 5, including

Figure 1:
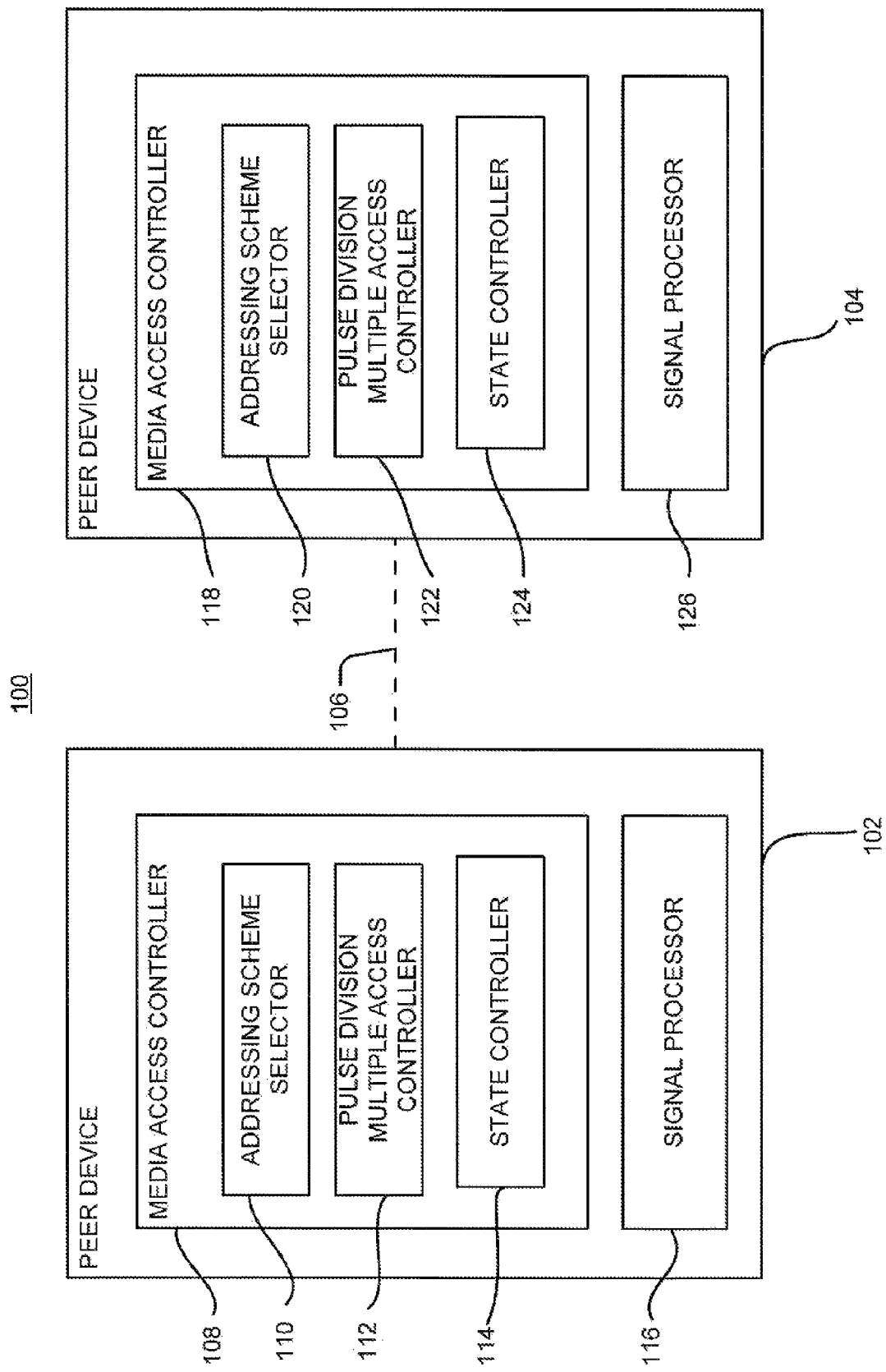
FIG. 1 is a simplified block diagram of several sample aspects of a communication system employing media access control for concurrent ultra-wide band channels.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on time hopping sequences. In some aspects concurrent channels may be established based on pulse repetition frequencies and time hopping sequences.

In some aspects a media access control scheme enables two or more devices to communicate over a common communication medium. For example, a spectrum of an ultra-wide band-based wireless PAN or BAN may be divided into channels in time-space. These channels may be defined, for example, to accommodate different types of data, different data rates, different qualities of service, or some other criteria. In such a channelization scheme, various techniques may be employed to set up the channels and make use of the channels.

FIG. 1 illustrates sample aspects of a system 100 where communication devices 102 and 104 are adapted to establish one or more communication channels 106 with one another. To reduce the complexity of FIG. 1, only a pair of devices is shown. It should be appreciated, however, that the system 100 may include several devices that share the communication medium by establishing one or more other channels (not shown in FIG. 1).

The devices 102 and 104 include media access controllers 108 and 118, respectively, for providing access to the communication medium. In some aspects the media access control architecture involves defining and implementing a network topology scheme, an addressing scheme, a channelization scheme (e.g., a channel access scheme), and a media access control state and control scheme. To provide such functionality, the media access controllers 108 and 118 may include an addressing scheme selector 110 and 120, respectively, a pulse division multiple access controller 112 and 122, respectively, and a state controller 114 and 124, respectively, and other components (not shown in FIG. 1).

In some aspects the network topology comprises a peer-to-peer topology. For example, any peer devices in the system 100 (e.g., devices 102 and 104) may incorporate the same or substantially similar media access control functionality. Moreover, one or more of the peer devices may independently provide access to the communication medium without the use of a coordinator, a central controller, or other similar functionality. Consequently, the peer devices may independently establish communication with one another. As an example, a peer device may establish a channel and send data over the channel without coordinating with a central coordinator that would otherwise attempt to ensure that only a single device accesses the medium at a time. As will be discussed in more detail below, the media access control addressing scheme, channelization scheme and state and control scheme may advantageously be employed to establish an effective peer-to-peer topology.

An addressing scheme selector may be used to define an addressing scheme for a given channel. Here, unique addressing may be provided for messages associated with a given channel while reducing power and bandwidth requirements. For example, in some aspects messaging for a given channel may employ a source address that is shorter than the network device address of a corresponding transmitter. In some aspects messaging for a given channel may employ a destination address that is shorter than the network device address of a corresponding receiver. Alternatively, in some aspects messaging for a given channel may not employ a source address, a destination address, or source and destination addresses. In this case, a unique signaling scheme may be defined for the channel such that a receiver may identify data destined for that receiver by simply analyzing the unique signaling scheme associated with received data.

A pulse division multiple access controller may be used to define and implement an ultra-wide band pulse division multiple access channelization scheme. In an ultra-wide band system the data rate may be relatively small compared to the spectrum bandwidth. Through the use of pulse division multiple access, the media access control may define several channels that concurrently coexist with little or no interference between the channels. Consequently, the media access control may independently define a channel, without coordinating with a coordinator or a central controller. For example, the devices 102 and 104 may independently establish several channels 106 and concurrently send data over the channels 106. In addition, other neighboring peer devices (not shown) may independently establish other channels that are operated concurrently with the channel(s) 106.

Moreover, through the use of pulse division multiple access the media access control may efficiently support different types of applications with different types of data and different data rates. For example, one channel may support asynchronous (e.g., bursty) data while another channel supports streaming data such as audio and/or video that is received at regular intervals. Advantageously, these channels may operate concurrently, with each channel having little or no effect on the operation of the other channel.

A state controller may be used to define and maintain various media access control states. For example, the media access control may employ one or more relatively low power states when data is not being transmitted and may employ one or more higher power states when data is being transferred. In some aspects, these different states may be associated with different levels of duty cycle, different knowledge of channel parameters, and different levels of channel synchronization.

The devices 102 and 104 also include signal processors 116 and 126, respectively, for processing signals associated with the channel(s) 106. For example, the signal processors 116 and 126 may process and/or generate signals to be transmitted over a channel. In addition, the signal processors 116 and 126 may process signals received over a channel.

Figure 2:
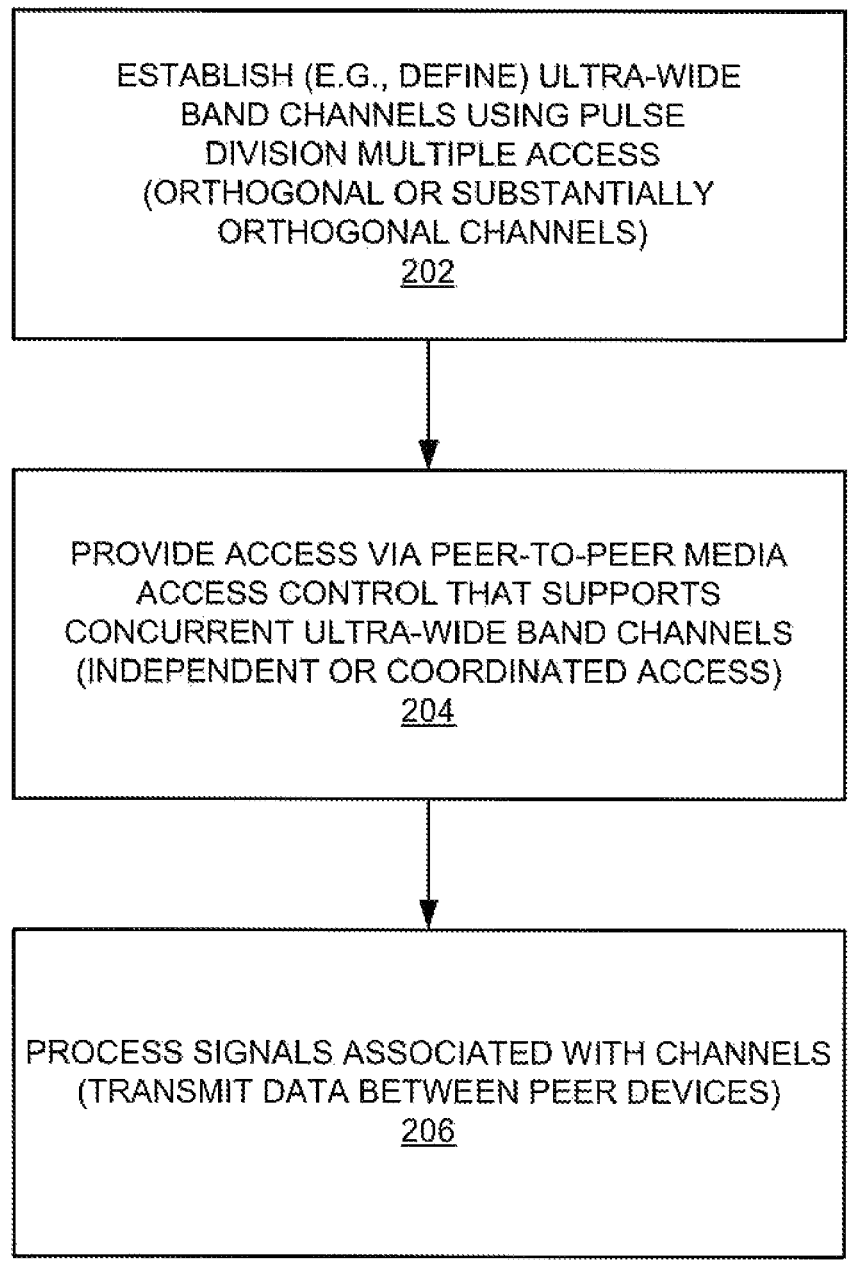
FIG. 2 is a flowchart of several sample aspects of operations that may be performed to provide media access control for concurrent ultra-wide band channels.

Sample operations of the system 100 will be described in conjunction with the flowchart of FIG. 2. For convenience, the operations of FIG. 2 (or any other flowchart herein) may be described as being performed by specific components. It should be appreciated, however, that these operations may be performed in conjunction with and/or by other components.

As represented by block 202, one or more of the devices may establish (e.g., define) one or more ultra-wide band channels. For example, in some aspects a device (e.g., device 102) may independently define a channel. Alternatively, a device may cooperate with a peer device (e.g., device 104) to define a channel.

As mentioned above, in some aspects the device(s) may establish a channel in accordance with a pulse division multiple access scheme. Advantageously, such a scheme may support orthogonal or substantially orthogonal channels.

As represented by block 204, a device may thus provide access via peer-to-peer media access control that supports concurrent ultra-wide band channels. As discussed above, in some aspects a media access controller may operate independently to provide access.

Alternatively, in some aspects one or more of the devices in the system 100 may function as a central controller or provide similar functionality to coordinate access to the communication medium. In some scenarios one device may naturally play a central role in a wireless personal area network. For example, a user's handset may be a coordinator or a master of a number of peripheral devices such as a headset, a cell phone, and a media player. In some aspects the coordinator or master functionality may be implemented in higher layer protocols or profiles.

As represented by block 206, a signal processor may process signals associated with one or more of the channels. For example, a signal processor may process signals to be transmitted over a channel and/or process signals received from a channel in accordance with the signaling scheme as discussed above. Thus, a signal processor may generate data pulses to be transmitted over the channel and/or extract data from pulses received via the channel. In this way, data may be sent between peer devices via the channel(s).

Through the use of one or more of the above aspects, media access control for a personal area network or a body area network may provide flexible and robust performance, in a low-cost system that consumes very little power. For example, a low power design may be achieved through the use of a relatively simple media access control design employing relatively few states. In addition, through the use of different media access control duty cycles, power may be saved while providing acceptable latency when data is to be transmitted.

Improved media access control performance also may be achieved through the use of an ultra-wide band pulse division multiple access scheme. For example, given that multiple channels may be operated concurrently and independently, the media access control may maintain a given level of quality of service for one type of channel irrespective of any data transmissions associated with any other channel in the system. The use of a pulse division multiple access scheme also may serve to further reduce the complexity of the media access control. For example, the media access control may not need to perform multiplexing operations as may otherwise be required in a media access control scheme that only allows one device to communicate over a communication medium at a given time. Moreover, the media access control may not need to perform associated reliability operations such as retransmissions, acknowledgments, and error checking.

Figure 3:
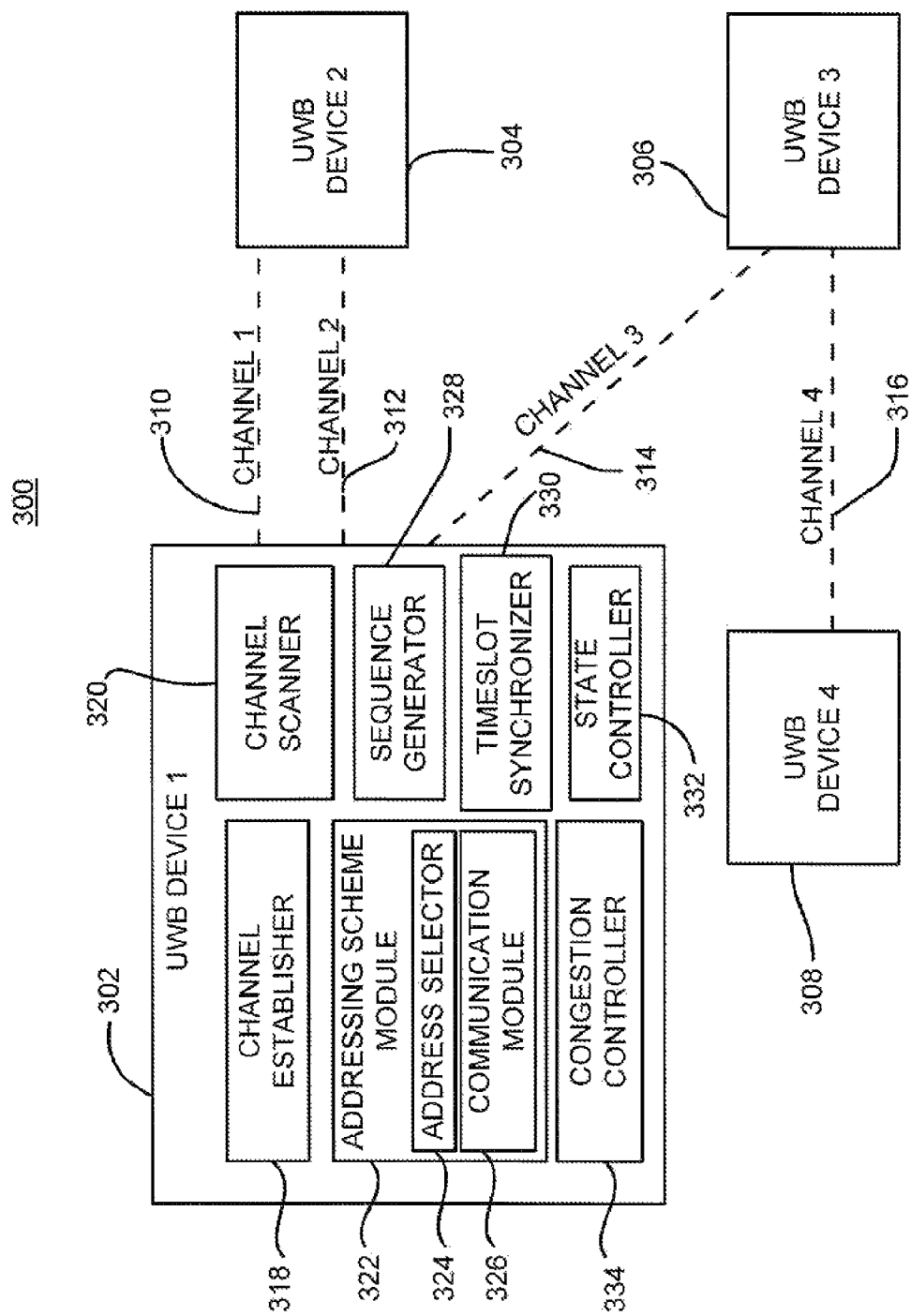
FIG. 3 is a simplified block diagram of several sample aspects of a communication system including several wireless devices.
Figure 4:
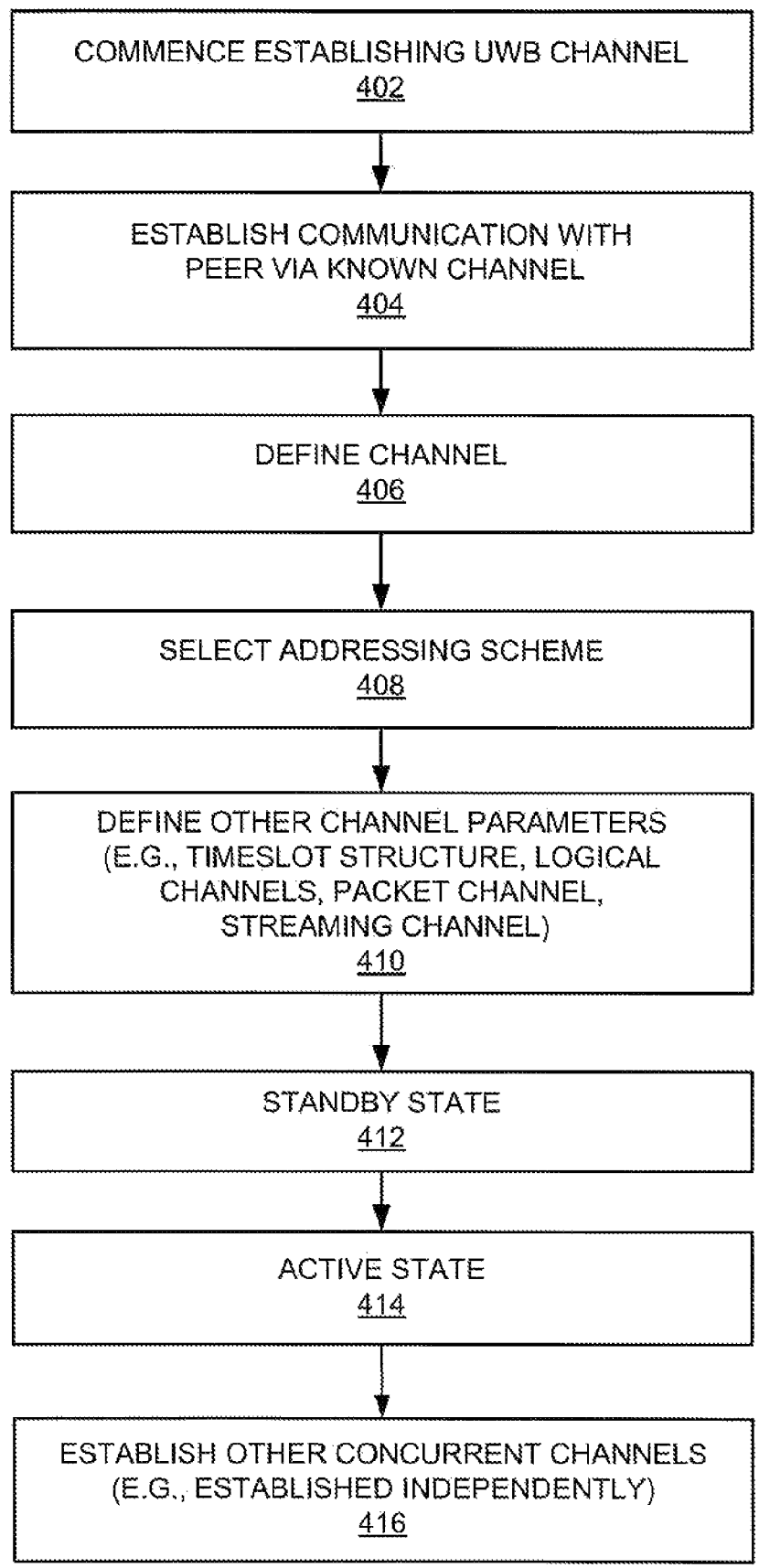
FIG. 4 is a flowchart of several sample aspects of operations that may be performed to establish and communicate via one or more ultra-wide band channels.

With the above overview in mind, additional details of various operations of a sample media access control scheme will now be discussed in the context of a communication system employing several ultra-wide band ("UWB") wireless devices. Specifically, FIG. 3 illustrates a system 300 where several UWB wireless communication devices 302, 304, 306, and 308 are adapted to establish wireless communication channels 310, 312, 314, and 316 with one another. The flowchart of FIG. 4 illustrates sample operations that may be used to establish a channel and communicate over the channel. To reduce the complexity of FIG. 3 selected aspects of the devices are only illustrated in conjunction with the device 302. It should be appreciated, however, that the devices 302, 304, 306, and 308 may incorporate similar functionality.

In the example of FIG. 3, the devices 302, 304, 306, and 308 communicate via a pulse-based physical layer. In some aspects the physical layer may utilize ultra-wide band pulses that have a relatively short length (e.g., on the order of hundreds of nanoseconds, a few nanoseconds, or some other length) and a relatively wide bandwidth. In some aspects an ultra-wide band system may be defined as a system having a fractional bandwidth on the order of approximately 20% or more and/or having a bandwidth greater on the order of approximately 500 MHz or more.

The device 302 illustrates several components that may be used to define, establish, and communicate over one or more ultra-wideband channels. For example, channel establisher component 318 (e.g., implementing functionality of the controller 112) may be used to define and/or select different pulse division multiple access ("PDMA") signal parameters for different channels. In a PDMA scheme, the timing of pulses (e.g., the pulse positions in time-space) for the channels may be used to differentiate one channel from another. Here, through the use of relatively narrow pulses (e.g., pulse widths on the order of a few nanoseconds) and relatively low duty cycles (e.g., pulse repetition periods on the order of hundreds of nanoseconds or microseconds), there may be sufficient room to interlace pulses for one or more other channels between the pulses for a given channel. FIG. 5 illustrates several examples of signaling parameters that may be employed in a PDMA scheme. For illustration purposes, the signaling of FIG. 5 is depicted as having a duty cycle on the order of 10%. It should be appreciated, however, that much lower duty cycles may be employed in practice (e.g., as discussed above).

Figure 5A:
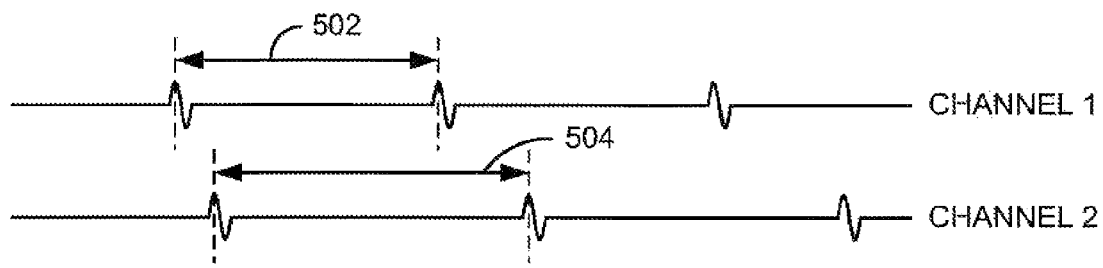
FIGS. 5A, 5B, and 5C, depicts several simplified examples of pulse signaling.

FIG. 5A illustrates different channels (channels 1 and 2) defined with different pulse repetition frequencies. Specifically, pulses for channel 1 have a pulse repetition frequency corresponding to a pulse-to-pulse delay period 502. Conversely, pulses for channel 2 have a pulse repetition frequency corresponding to a pulse-to-pulse delay period 504. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies, substantially all pulses for a given channel may be transmitted at different times than pulses for any other channel.

The pulse repetition frequency defined for a given channel may depend on the data rate or rates supported by that channel. For example, a channel supporting very low data rates (e.g., on the order of a few Kbps) may employ a corresponding low pulse repetition frequency. Conversely, a channel supporting relatively high data rates (e.g., on the order of a several Mbps) may employ a correspondingly higher pulse repetition frequency.

Figure 5B:
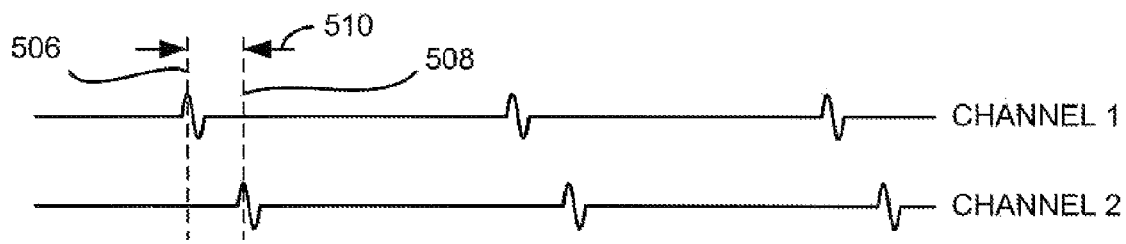

FIG. 5B illustrates different channels (channels 1 and 2) defined with different pulse offsets. Pulses for channel 1 are generated at a point in time as represented by line 506 in accordance with a first pulse offset (e.g., with respect to a given point in time, not shown). Conversely, pulses for channel 2 are generated at a point in time as represented by line 508 in accordance with a second pulse offset. Given the pulse offset difference between the pulses (as represented by the arrows 510), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 5C:
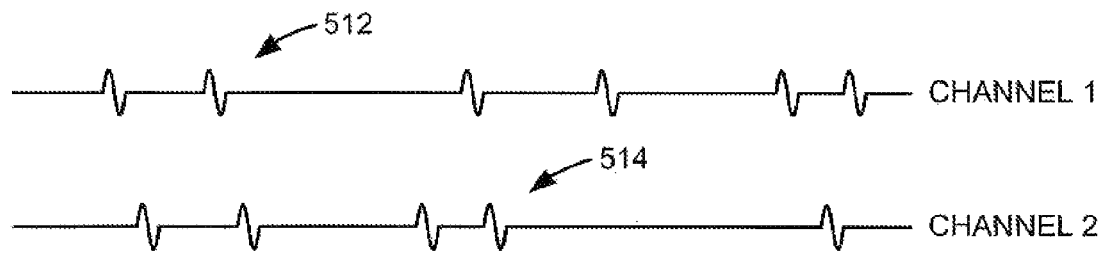

FIG. 5C illustrates different channels (channels 1 and 2) defined with different timing hopping sequences. For example, pulses 512 for channel 1 may be generated at times in accordance with one time hopping sequence while pulses 514 for channel 2 may be generated at times in accordance with another time hopping sequence. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

It should be appreciated that other techniques may be used to define channels in accordance with a PDMA scheme. For example, a channel may be defined based on different spreading pseudo-random number sequences, or some other suitable parameter or parameters. Moreover, a channel may be defined based on a combination of two or more parameters.

Referring again to FIGS. 3 and 4, the device 302 may establish a channel independently or in cooperation with one or more of the other devices 304, 306, and 308 in the system 300 (block 402). As represented by block 404, in some aspects a device may be configured to establish a channel with another device by initially communicating with the other device over a known discovery channel. Here, the device seeking to establish the channel may send preliminary messages (e.g., polling messages) over the known channel. In addition, each device in the system may be configured to periodically scan the known channel for any preliminary messages.

Accordingly, the devices may configure their respective transceivers (e.g., by configuring a transmitter in one device and a receiver in another device) to initially use default parameter values for sending signals to and receiving signals from the wireless medium. For example, a device may set the pulse repetition frequency to a value defined for a known channel. In addition, the device may set the preamble sequence to the sequence defined for the known channel. Also, in an implementation that uses time hopping for the known channel, the device may configure its transceiver to use the default sequence (e.g., a default pseudorandom sequence).

Once preliminary communications are established between two or more devices over the known channel, the devices may perform an association procedure whereby the devices learn the respective capabilities of each device. For example, during an association procedure each device may be assigned a shortened network address (e.g., shorter than a MAC address), the devices may authenticate one another, the devices may negotiate to use a particular security key or keys, and the devices may determine the level of transactions that may be conducted with each device. Based on these capabilities, the devices may negotiate to establish a new channel for subsequent communication.

Figure 6:
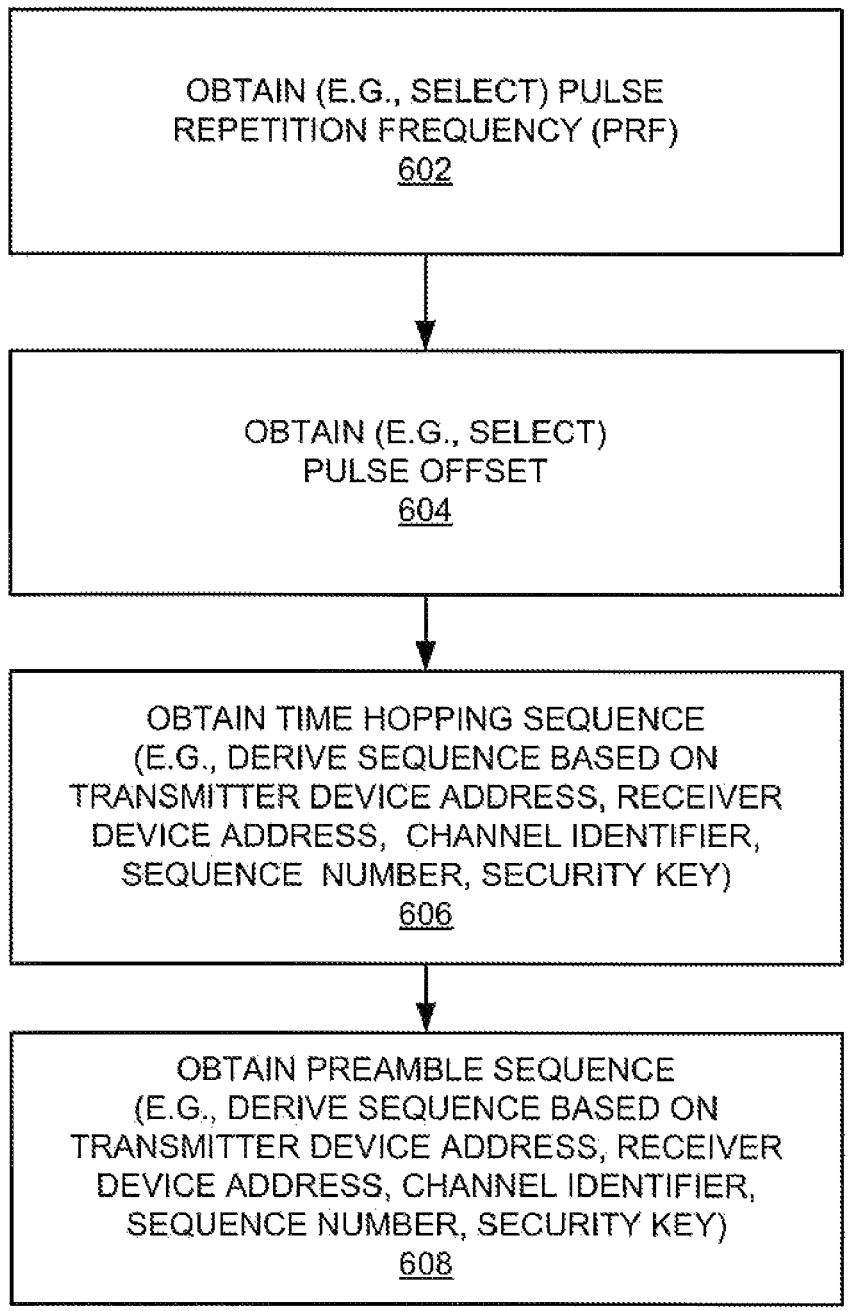
FIG. 6 is a flowchart of several sample aspects of operations that may be performed to define a channel.

As represented by block 406, one or more of the devices may select channel parameters to be used for the new ultra-wide band channel. Referring to FIG. 6, the device(s) may select channel parameters such as a pulse repetition frequency, a pulse offset, a time hopping sequence, a preamble sequence, a pseudo-random number-based sequence, some other suitable parameter(s), or a combination of two or more of these parameters. As discussed above, these channel parameters may be selected to avoid or reduce the probability of interference with other channels that may operate concurrently with the new channel.

As represented by block 602, the device(s) may obtain (e.g., select) a pulse repetition frequency to be used for the channel. FIG. 5A discussed above illustrates two examples of pulse repetition frequencies that may be selected here.

As represented by block 604, the device(s) may obtain (e.g., select) a pulse offset to be used for the channel. FIG. 5B discussed above illustrates two examples of pulse offsets that may be selected here.

As represented by block 606, the device(s) may obtain (e.g., select) a time hopping sequence to be used for the channel. FIG. 5C discussed above illustrates two examples of time hopping sequences that may be selected here.

In some aspects the device(s) may select a time hopping sequence based on one or more device-related parameters or other parameters. For example, a time hopping sequence may be very long such that a relatively large overhead would be associated with sending the time hopping sequence from a transmitter to a receiver over the communication medium. Thus, to avoid transmission of the sequence, the devices (incorporating the transmitter and receiver) may derive the sequence as a function of parameters known by the devices. For example, a sequence generator 328 (FIG. 3) may derive a time hopping sequence based on one or more parameters relating to the channel such as an address of a device that establishes the channel (e.g., a transmitter and/or one or more receivers), a channel number, a sequence number, or a security key. In some aspects the channel number, the sequence number, or the security key may be generated or assigned by the device(s).

The device(s) also may define one or more other parameters that define or otherwise serve to identify a channel. For example, as represented by block 608, the device(s) may obtain (e.g., select) a preamble sequence to be used for the channel. A receiver may use a known preamble sequence to acquire transmissions from a given channel. For example, during a channel acquisition procedure a transmitter may repetitively send the preamble sequence. The receiver, in turn, may scan all hypotheses of pulse positions (e.g., as defined by the pulse repetition frequency and pulse offset) and the phase of the preamble sequence (e.g., relative to the start of the sequence) to acquire the preamble sequence. Here, the receiver may test multiple hypotheses in parallel to reduce the channel acquisition time.

In some aspects the device(s) may select a preamble sequence based on one or more device-related parameters or other parameters. For example, to avoid sending a long preamble sequence over the communication medium, the devices may derive the sequence as a function of parameters known by the devices. For example, the sequence generator 328 may derive a preamble sequence based on one or more parameters relating to the channel such as an address of a device that establishes the channel (e.g., a transmitter and/or one or more receivers), a channel number, a sequence number, or a security key. In some aspects the channel number, the sequence number, or the security key may be generated or assigned by the device(s).

In some aspects a device may independently establish a channel without coordinating with respect to a media access control for any other channel. For example, the device may establish a channel without knowledge of (e.g., without determining) the signaling parameters of other channels that are operating nearby. This approach may be made possible through the use of signaling scheme selection techniques that define pulse parameters such that the neighboring channels generate pseudo-orthogonal pulses. That is, a given channel may generate pulses such that there is a low probability of the pulses interfering with (e.g., occurring at the same time as) pulses for another channel.

Various techniques may be employed to unilaterally select the parameters to be used for a given channel. For example, the device may randomly select the channel parameters. Alternatively, the device may select channel parameters based on a set of one or more device-related parameters (e.g., a device address, a device location, etc.) or some other unique or relatively unique parameters (e.g., a time of the day, etc.).

In some aspects a device may select channel parameters based on information the device has regarding the channel parameters of other channels that are or have been defined in the system (e.g., currently active channels). A new channel may thus be defined in such as way as to reduce or eliminate interference with other channels.

In some aspects a device may communicate (e.g., cooperate) with one or more other devices to determine the signaling parameters of other channels that are operating nearby. For example, a device may select channel parameters based on information the device obtains from other devices regarding the channel parameters of other channels defined in the system. In some cases, in conjunction with the association procedure, two or more devices may negotiate to select the channel parameters. Based on this information, the device may then select one or more unique parameters for any channel it is establishing such that interference with other channels is reduced or eliminated.

When establishing a channel, the device 302 (e.g., component 318) may communicate with another device or other devices that will use a given channel so that each device will learn the signaling parameters used to communicate over the channel. In some implementations channel parameters such as the pulse repetition period, the preamble sequence, and the time hopping sequence may be exchanged during an association procedure. However, when using relatively narrow pulses, synchronization between a transmitter and a receiver may be lost relatively easily. Accordingly, the offset of pulse may be acquired with every transmission to maintain relatively precise synchronization between the transmitter and the receiver (e.g., to a degree of nanoseconds).

Figure 7:
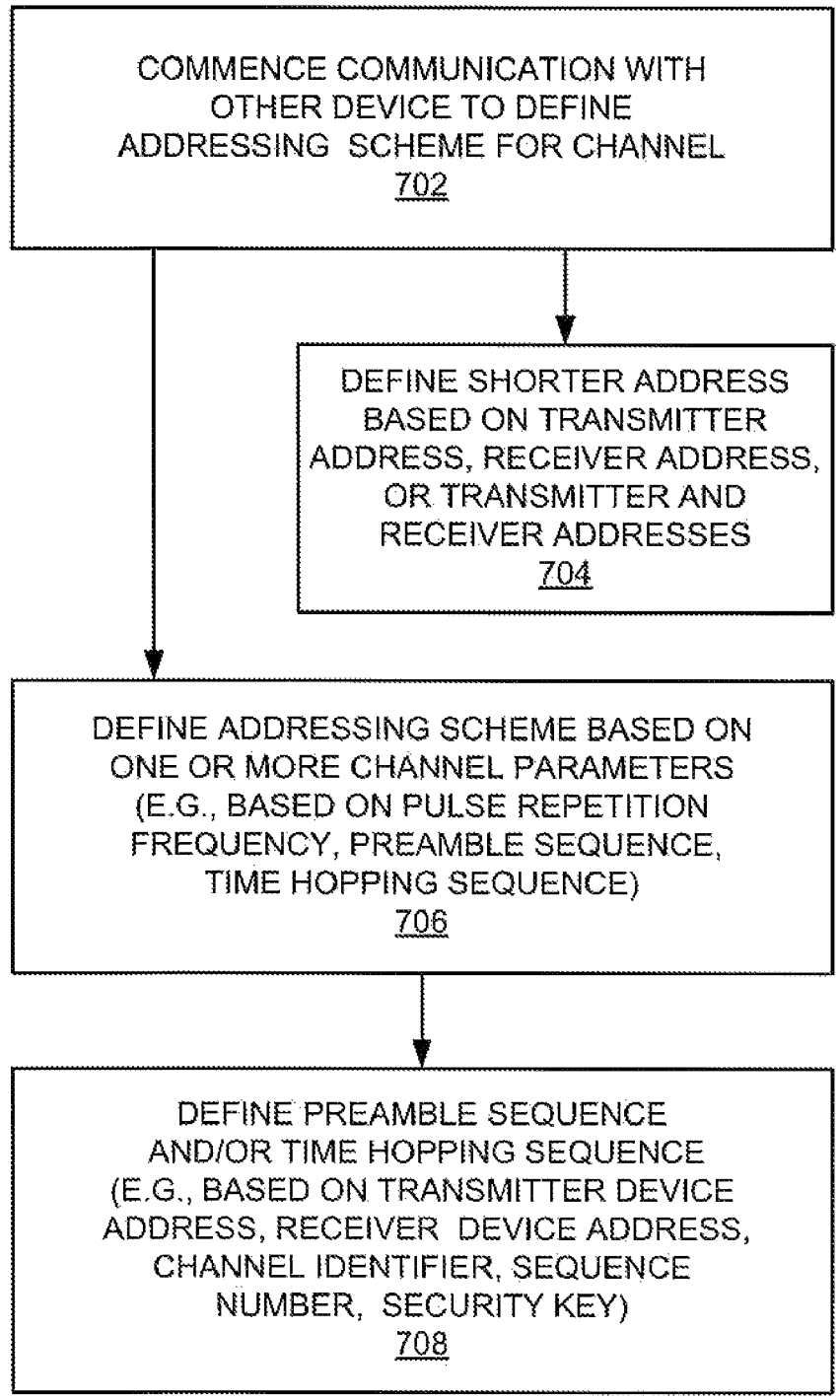
FIG. 7 is a flowchart of several sample aspects of operations that may be performed to define an addressing scheme for a channel.

Referring again to FIG. 4, at blocks 408 and 410 the device(s) also may define one or more other parameters relating to a channel. For example, as represented by block 408 an addressing scheme module 322 (e.g., implementing functionality of the selector 110) in the device(s) of FIG. 3 may define an addressing scheme to be used for the channel. FIG. 7 illustrates several sample operations that may be performed by the module 322.

As represented by block 702, in some aspects a device may communicate (e.g., negotiate) with one or more other devices to define an addressing scheme. To this end, the module 322 may include and/or operate in conjunction with a communication module 326 that facilitates such communication, negotiation, etc.

In general, each device communicating over a network may be assigned a unique device address ("DEV_ADDR"). In some implementations, however, it may be desirable to use a shorter address or to not use any device address when sending messages over a channel. In this way, the power and/or bandwidth associated with corresponding channel signaling may be reduced.

As represented by block 704, in some aspects a short network address (having fewer bits than the device address) may be assigned to the device, and used to further clarify the source, the destination, or the source and destination. For example, an address selector 324 of the module 302 may derive this shorter network address as a function of the device address of a transmitter utilizing the channel, the device address(es) of one or more receivers utilizing the channel, or a combination of these device addresses. Alternatively, the module 322 may negotiate with nearby devices to select a shorter address or the shorter address may be derived in some other manner. In some cases the module 322 may employ an address conflict resolution mechanism.

In some implementations certain subsets of the device address space may be reserved for group addresses. These group addresses may be associated with device types or may be used for broadcast or multicast purposes. Here, any node that learns the group address may be configured to receive the multicast channel. Both asynchronous (e.g., packet) channels and streaming channels may support broadcasting or multicasting.

As represented by block 706, through the use of PDMA or some other suitable scheme it may be possible to omit the destination address from channel messaging. For example, as discussed above a PDMA scheme may be used to uniquely define a channel in accordance with one or more channel parameters. Such parameters may include, for example, a pulse repetition frequency, a preamble sequence, a time hopping sequence, etc.

At block 708, the preamble sequence and/or the time hopping sequence may be defined based on various parameters as discussed above. For example, the sequence generator 328 may define a sequence based on a transmitter device address, one or more receiver device addresses, a channel identifier, a sequence number, a security key, some other parameter, or some combination of two or more of these parameters.

Accordingly, the address selector 324 may select an addressing scheme whereby a destination address is not used in channel messaging because communication occurs via a designated channel characterized by unique or relatively unique channel signaling parameters. Moreover, in some aspects the channel signaling parameters may be based on the device address of one or more receivers that utilize the channel. In this way, the channel signaling parameters may uniquely define a channel associated with a given receiver or receivers.

An implementation that uses a shorter network address (source, destination, or both) or omits the network address may advantageously be employed in conjunction with a streaming channel. In this case, overhead otherwise associated with each transmission may be reduced or omitted. Given that a streaming channel generally sends data on a regular basis, the reduction in overhead may be significant.

Referring to block 410 in FIG. 4, the device(s) also may define channel parameters relating to transmission of data over a channel. Such parameters may include, for example, a timeslot structure, logical channels, and channel types (e.g., packet channel or streaming channel).

Figure 8:
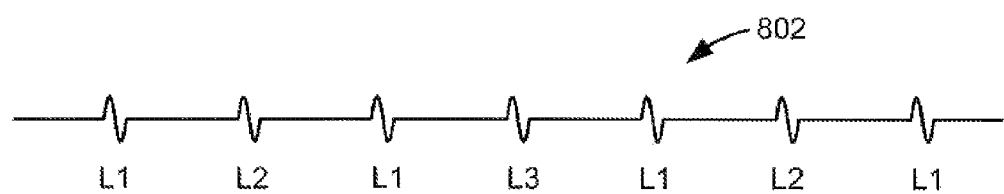
FIG. 8 is a simplified diagram illustrating an example of a logical channel scheme.

In some aspects several logical channels may be defined a given channel to, for example, accommodate different types of data, different data rates, different qualities of service, or some other criteria. In some aspects pulse division multiplexing ("PDM") may be employed to provide multiple logical channels within a given channel. In this case pulse positions are assigned to each logical link. For example, FIG. 8 depicts a simplified example where pulses 802 transmitted in a channel are associated with a first logical channel (L1), a second logical channel (L2), or a third logical channel (L3). Channel assignments in PDM are orthogonal. Consequently, PDM-based sharing over a single channel may be more efficient than PDMA based multiple channels. There may, however, be a corresponding tradeoff in complexity.

In some implementations a time division multiplexing ("TDM") scheme such as Aloha may be employed to provide the logical channels. In a modified version of the Aloha scheme, a transmitter sends a request-to-synchronize ("RTS") packet and expects to receive a confirmation-to-synchronize ("CTS") packet from the receiver. If the transmitter receives the CTS, transmitter will know that the receiver has synchronized with it, rather than with some other transmitter. The transmitter then sends the data packet. The RTS and CTS may be smaller than typical data packets, thereby reducing overhead.

A timeslot structure for a channel may define a series of timeslots whereby various data transmissions for the channel are timed to occur within designated timeslots. In this case, each device may include a timeslot synchronizer 330 (FIG. 3) that implements some form of synchronization to ensure the each device communicating via the channel maintains the timing of the timeslot structure.

A timeslot structure may be used for various purposes. For example, various logical channels may be assigned to various timeslots. Also, a pulse repetition frequency may be defined based on a timeslot structure. In some aspects media access control operation may benefit from the use of a slotted structure. For example, a transmitter may adjust the pulse repetition frequency on a per slot basis to adapt to a desired duty cycle or data rate. In addition, a slotted structure may be used to synchronize the phase of a time hopping sequence between a transmitter and a receiver. Typically, a streaming channel may be established through the use of a timeslot structure. In addition, a slotted structure may be employed for a packet channel. For example, through the use of a slotted structure a transmitter and receiver may maintain a relatively loose slot level synchronization when packets are not being sent.

In some implementations the device 302 may incorporate a component to control or otherwise account for congestion in the wireless medium. For example, a congestion controller 334 may implement a request-to-synchronize ("RTS") and confirmation-to-synchronize ("CTS") scheme, ALOHA, CSMA, or some other suitable congestion management scheme.

Once all of the devices have generated or obtained the selected channel parameters, the devices establish the ultra-wide band channel based on these parameters. For example, the devices may set up their respective transceivers to transmit and receive signals in accordance with the selected channel parameters.

The devices may then process signaling as necessary to communicate via the established channel. Thus, a transmitter may generate pulses with the appropriate pulse repetition frequency and, if applicable, pulse offset and time hopping sequence. Similarly, a channel scanner 320 of a receiver may scan the communication medium for pulses having that pulse repetition frequency and, if applicable, pulse offset and time hopping sequence.

To support efficient channel access, different data types, and different data rates while maintaining relatively low power consumption, in some aspects a channel access scheme may utilize various states of operations. To this end, the device 302 may include a state controller 332 (e.g., similar to state controller 114) that controls the state of the device 302 or of one or more components (e.g., a transmitter and/or a receiver) of the device 302 with respect to a given channel.

Referring to FIG. 4, in some aspects media access control may employ a standby state (block 412) and an active state (block 414). These states may relate to different levels of duty cycle, different knowledge of channels parameters, different levels of channel synchronization, or some combination of these parameters.

For example, the standby state may comprise a state of relatively low duty cycle scanning of and/or transmission over a channel. That is, in this state there may not be any active data payload transmissions. In this state the transmitter may keep silent, while the receiver periodically scans certain channels. For example, a receiver may waken on the order of once every 100 mS-500 mS to scan for a period on the order of 500 μS. In general, the selection of the interval of scanning involves a tradeoff between duty cycling and link access time budget. During the standby state, the two devices (e.g., the respective transmitter and receiver) may be completely out of synchronization. Alternatively, a very low level of synchronization may be employed. In some implementations the scanning may occur on channels that have been set up, on a node specific paging channel, or on a known discovery channel.

In contrast, the active state may comprise a state of higher duty cycle scanning of and/or transmission over a channel. For example, in the active state, receivers may expect data transfer and may listen continuously. For a packet channel, each data frame from the transmitter is prefixed with preamble for channel acquisition. For a streaming channel, pulses may be continuously sent over the air according to channel parameters.

Some implementations may employ one or more low duty cycle modes in the active state whereby a receiver does not to listen to the channel continuously. For example, a receiver may scan the channel with a duty cycle lower than 100% to conserve power, but at a higher duty cycle than in the standby state to manage latency. In addition, a sniff mode may be employed in the active state to maintain synchronization when there is no data to send. Here, the pulse repetition frequency may be reduced to a lower value, whereby the duty cycle is low yet synchronization is still maintained. For a packet channel, the media access control may maintain loose slot level synchronization by sending a short preamble (e.g., every slot in a slotted channel).

The active state may support connection-oriented channels and connectionless channels. In a connection-oriented channel a transmitter device and a receiver device that wish to communicate via a channel may agree on a set of channel parameters to enable communication via the channel. One way of achieving an agreement between the two devices is to set up the channel explicitly. For example, the transmitter device may send a channel setup message to the receiver device. In response to the setup message the receiver device may send a confirmation message to the transmitter device.

The exchange of channel setup messages may lead to unwanted overhead and latency. Accordingly, in some aspects a connectionless channel may be used whereby channel setup messages are not exchanged to establish the channel. In this case, a default set of channel parameters (e.g., which all devices may agree to) may be employed to establish a channel. In other words the devices may communicate over a channel through the use of default channel parameters that are known to both the transmitter device and the receiver device.

A transition from the standby state to the active state may be caused by an operation such as a discovery procedure or a paging procedure. Both of these procedures start active data transfer on specific channels.

During a discovery procedure communication may occur on a common discovery channel where the channel parameters are known to all devices. There may be multiple common discovery channels for different levels of functionality.

One purpose of the discovery procedure may be to discover unknown devices in the vicinity by collecting the device addresses of these devices. With the knowledge of the device addresses (and, optionally, other information) a specific channel may be set up.

During a paging procedure, communication may occur on a specific channel that has been set up, or on a node-specific paging channel. In this case, the designated devices (associated with the channel) are awakened and brought to the active state.

A transition from the active state to the standby state may be due to a timeout or due to a loss of synchronization on the channel. Thus, a transition from the active state may occur when there is no data transfer for a period of time, or as the result of a lost connection. The timeout parameter may originate from higher layer protocols or profiles.

A transition from the active state also may be initiated by an explicit request. For example, a device may send a message indicating that it has completed its immediate transmissions. Based on this message, a device may choose to transition to the standby state.

Media access control procedures such as the discovery procedure and the paging procedure may occur on a specific control channel, such as a discovery channel or a paging channel, or more generally, on any data channel that has been established. On a packet channel control messages may be exchanged through explicitly marked control packets. These control packets may be sent with higher or lower priority for quality of service purposes. On a streaming channel a fraction of slot may be assigned to carry control messages.

For certain applications (e.g., voice or audio streaming) application layer control messages may be employed. These messages may be exchanged on a separate application layer control channel, or imbedded within the data channel. For example, a special media access control message may be designed to piggyback an application layer control message.

Figure 9:
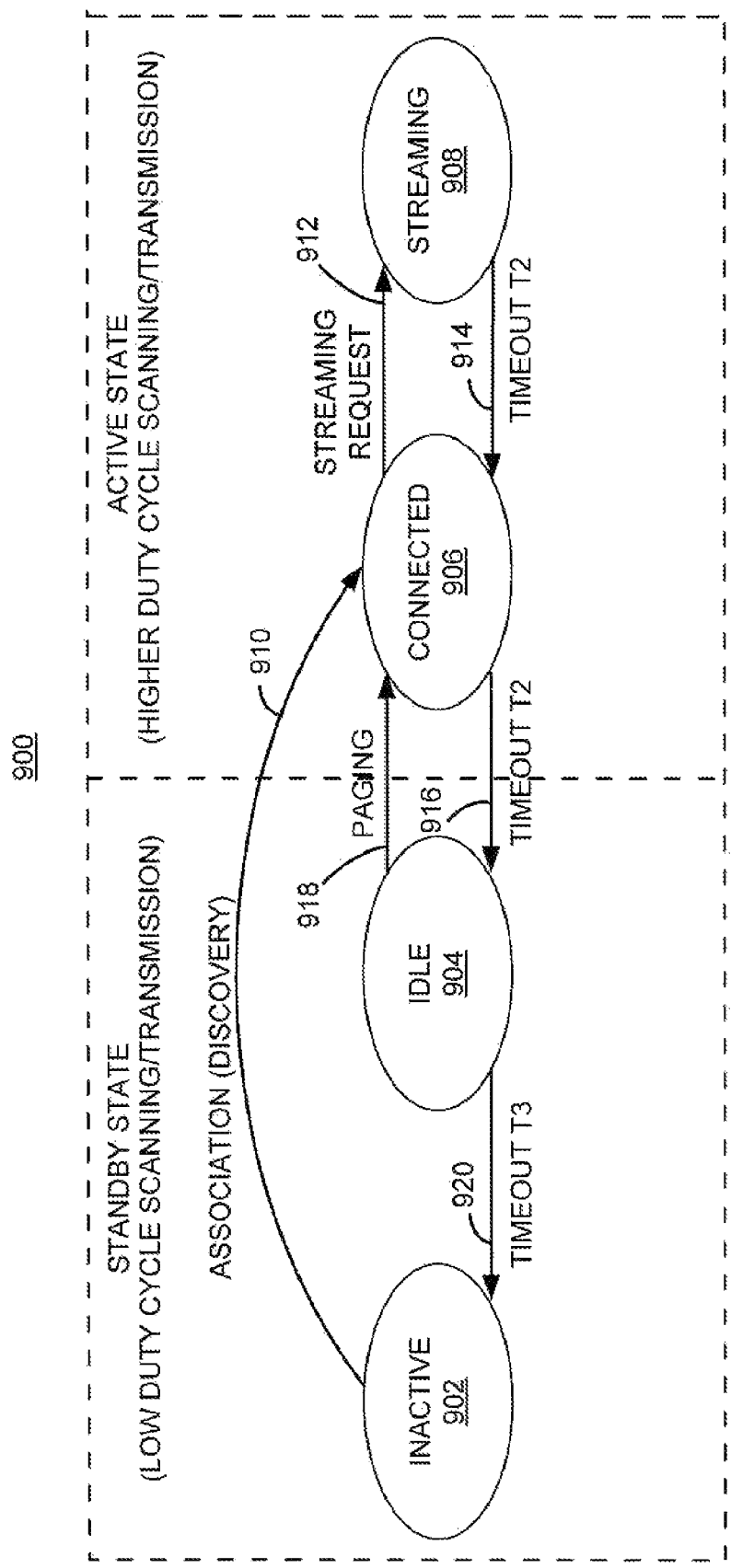
FIG. 9 is a simplified diagram illustrating an example of a state diagram for media access control.

FIG. 9 illustrates an example of a state diagram 900 representing operations for a channel access scheme that may be employed to transfer data from a transmitter to one or more receivers. Here, the standby and active media access control states are represented by the dashed boxes. In some aspects the standby state and/or the active state may comprise multiple states. In the example of FIG. 9 the standby state comprises an inactive state 902 and an idle state 904 while the active state comprises a connected state 906 and a streaming state 908. It should be appreciated, however, that in other implementations (or for other channels) a different number and different types of states may be employed.

The inactive state 902 may be defined as a state where a receiver is not aware of the parameters for a given channel, or where a receiver is not listening to the channel. Hence, this state may be a very low duty cycle state. To set up a channel at a receiver, a transmitter distributes the channel parameters during, for example, an association procedure or a discovery procedure. The corresponding change in state is represented by line 910 in FIG. 9.

In the connected state 906 a receiver may expect data transfer and, consequently, may listen continuously or on a relatively regular basis. In some aspects data transfer from the transmitter to the receiver(s) during the connected state may be in the form of packets. In some aspects, each data frame transmitted by the transmitter may be prefixed with a preamble sequence that facilitates acquisition of the channel by a receiver. The data frames may be acknowledged by a receiver through a separate channel. If no data frame is transferred over the channel for a given period of time, a receiver may move to the idle state 904 to save power. This change in state is represented by line 916 in FIG. 9. Alternatively, a channel may be terminated, resulting in a transition (not shown) to the inactive state 902.

The idle state 904 may be a state of relatively low duty cycle. For example, in this state a receiver may maintain (or otherwise have access to) at least a portion of the parameters relating to the channel (e.g., a device address of the transmitter) that enable the receiver to periodically scan the channel. In general, the time interval between scans may be a trade-off between duty cycling and channel access time budget.

If there is no activity during the idle state 904 for a specified period of time, the idle state 904 may timeout. This, in turn, may cause a transition to the inactive state 902 (line 920). Alternatively, the transition 920 may be initiated upon command.

A transmitter also may send a message (e.g., a paging message) to a receiver that is in the idle state 904 to, for example, reestablish regular communication with the receiver. Thus, upon receiving the message, the receiver may move to the connected state 906 as represented by line 918.

The streaming state 906 may support relatively continuous bit rate applications such as, for example, audio (e.g., radio, music or voice calls), video or some other form of streaming data. This state may be implemented to reduce overhead (e.g., the preamble) otherwise associated with the connected state. Here, since data is being sent on a relatively continual basis, overhead associated with facilitating acquisition of the channel by the receiver may be omitted or substantially reduced. The transmitter may explicitly send a message requesting initiation of a streaming channel, or may piggyback the request when transmitting a data frame (as represented by line 912). Data bits may be transferred continuously over the streaming channel with or without frame structure. Some form of acknowledgement may be provided through a separate channel. In some implementations, a relatively short interruption in the streaming of data may cause the streaming state 908 to time out thereby causing a transition to the connected state 906 (as represented by line 914). Alternatively, the streaming channel may be affirmatively terminated (e.g., via a message in the streaming channel), resulting in a transition to the connected state 906 or some other state (transition not shown). From the above it should be appreciated that switching between the connected state 906 and the streaming state 908 may advantageously be accomplished within the channel, at essentially any time.

A state diagram similar to the state diagram 900 may be employed for each channel defined in a given network. In other words, each channel may independently transition through its respective states based on the current requirements of the application using that channel. Moreover, each channel may independently specify a different level of throughput and duty cycling by, for example, setting the scanning interval in the idle state 904 and/or the pulse repetition frequency of the channel.

Referring again to FIG. 4, as represented by block 416 operations similar to those discussed above may be performed to establish and use other channels in the communication system. In this case, however, a device may select different parameters at blocks 406, 408, and 410 to establish a channel that may be used concurrently with other channels in the system. Here, the channel parameters (e.g., pulse repetition frequency, time hopping sequence, etc.) for one or more channels may be selected such that concurrent channels may operate with relatively little interference between the signals (e.g., pulses) of the channels.

Thus, through the use of a media access control scheme as taught herein, the devices 302, 304, 306, and 308 may concurrently (e.g., simultaneously) utilize a shared medium. For example, the devices 302, 304, 306, and 308 may concurrently transmit signals within the same ultra-wide band frequency band. As depicted in FIG. 3, the device 302 may communicate with the device 304 via two or more concurrently operating channels (e.g., channels 310 and 312). In addition, the device 302 may concurrently communicate with multiple devices (e.g., devices 304 and 306) over different channels (e.g., channels 310 and 314). Furthermore, one set of devices (e.g., devices 302 and 304) may communicate via one channel (e.g., channel 310) while another set of devices (e.g., devices 306 and 308) concurrently communicate via another channel (e.g., channel 316).

Moreover, the channels may be adapted to carry different types of data at different data rates. For example, a channel may carry packet data, streaming data or some other form of data. In addition, a channel may be configured (e.g., via the pulse repetition frequency, a timeslot structure or logical channel definitions) to carry data at different rates. Thus, the channels 310, 312, 314, and 316 in FIG. 3 may be independently defined to carry the specific data required for a given application.

Advantageously, these channels may be established without the use of a central coordinator as discussed above. Each device may define the channel parameters randomly, based on parameters that may be unique to the device or devices establishing the channel (e.g., device addresses), or based on parameters selected by the device or devices. Accordingly, a pure peer-to-peer network (or sub-network) may be established through the use of such devices. That is, the devices that establish the channels in the network may be peer devices that have substantially equivalent media access control ("MAC") functionality whereby no coordination may be required between different peer-to-peer channels to establish and use such channels.

Through the use of a PDMA scheme as taught herein, an ultra-wide band system employing low duty cycle signaling may provide low power communications for applications such as a wireless PAN or BAN. In some aspects the corresponding wireless devices may, for example, operate for several years powered only by a relatively small battery (e.g., a watch battery). Such applications may utilize a wide variety of data rates ranging from, for example, relatively low data rates on the order of 1 Kbps to relatively high data rates on the order of 10 Mbps. To effectively support such applications, a relatively simple solution with small protocol stack and low overhead as taught herein may be employed. Moreover, the PDMA scheme may provide sufficient flexibility to simultaneously handle other data rates and maintain different levels of duty cycle for these applications.

The teachings herein may be incorporated into various types of systems implemented using various types of devices that support various communication techniques and protocols. For example, in some aspects a system (e.g., system 300) may comprise a transmitted reference system. In this case, a device sends data by transmitting a reference pulse followed by an associated data pulse. A device that receives the pulses may then use the reference pulse as a "noisy matched filter" to detect the data represented by the data pulse. It should be appreciated, however, that the system may employ other pulse-based and/or ultra-wide band signaling techniques.

In a typical implementation, one or more of the components described herein may be implemented in a device in a transmitter component, a receiver component or, in combination, in a transceiver component. For example, a transmitter may incorporate functionality relating to the components described above for device 102 and device 302 to define and establish a channel, and generate pulses to transmit data over the channel in accordance with the defined signaling scheme. Similarly, a receiver may incorporate functionality relating to the components described above for device 102 and device 302 to establish a channel with a transmitter, and detect pulses transmitted over the channel in accordance with the corresponding signaling scheme. These and other components and associated operations will be discussed in more detail in conjunction with FIGS. 10, 11, and 12.

Figure 10:
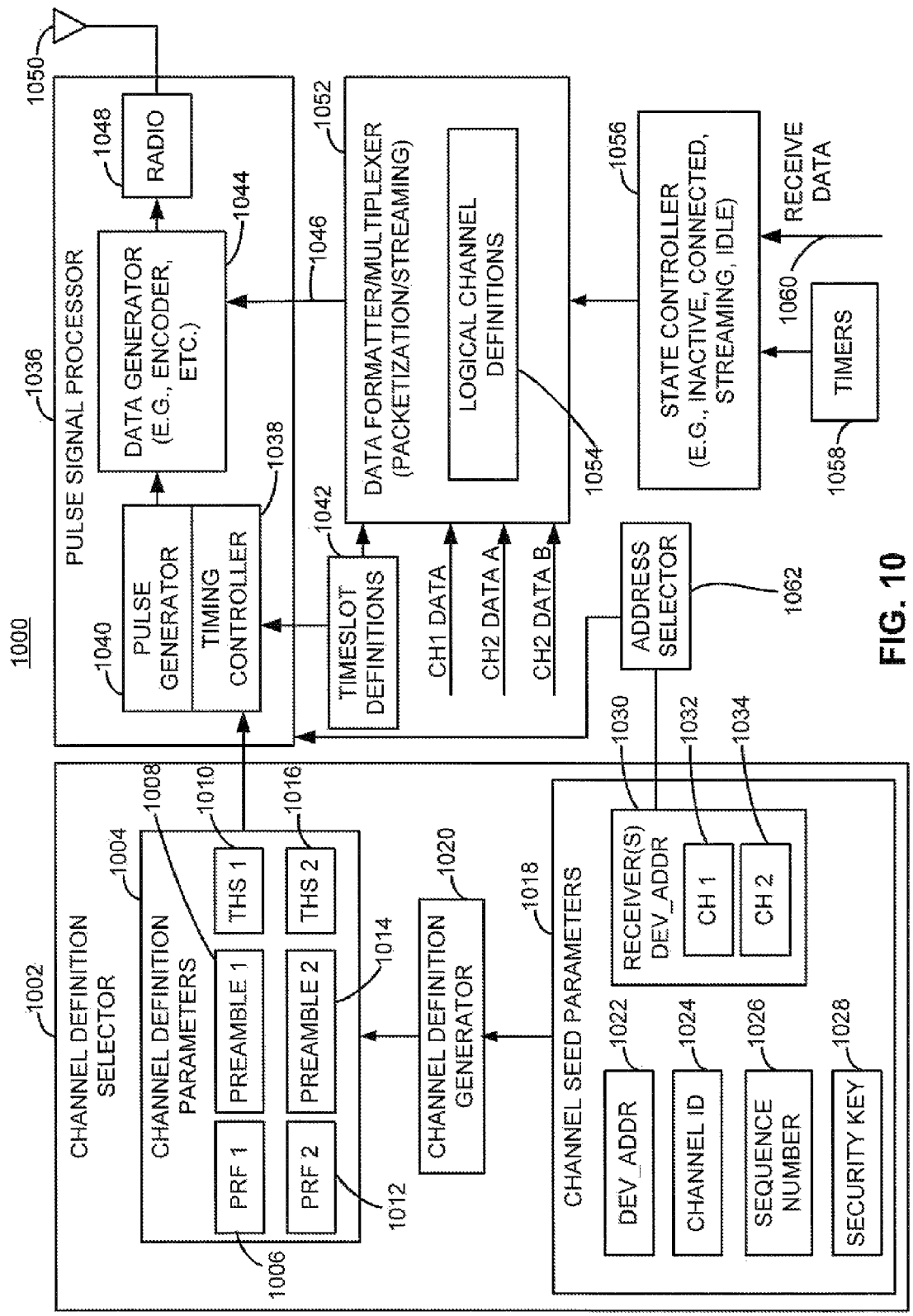
FIG. 10 is a simplified block diagram of several sample aspects of a transmitter employing pulse signaling.

FIG. 10 illustrates several sample components that may be incorporated into a transmitter 1000 that supports PDMA. Here, a channel definition selector 1002 (e.g., corresponding to PDMA controller 112) provides a signaling scheme for establishing one or more channels. For example, the selector 1002 may provide channel definition parameters 1004 for a given channel such as a pulse repetition frequency ("PRF"), a preamble sequence, and a time hopping sequence ("THS"). FIG. 10 illustrates an example where two sets of parameters (parameters 1006, 1008, and 1010 and parameters 1012, 1014, and 1016) have been defined for different channels (e.g., a default channel "1" and a new channel "2").

One or more of the channel definition parameters 1004 may be generated based on one or more channel seed parameters 1018. For example, a channel definition generator 1020 may select a particular value for a pulse repetition frequency or select a particular sequence for a preamble or for time hopping based on a value of a seed parameter 1018 or based on some function of a combination of two or more seed parameters 1018. In the specific example depicted in FIG. 10, the channel definition generator 1020 may generate one or more of the channel definition parameters 1004 based on a device address ("DEV_ADDR") 1022, a channel identifier ("ID") 1024, a sequence number 1026, and a security key 1028. In some aspects a channel definition parameter 1004 may be generated based on one or more device addresses 1030 of one or more receivers that may receive data via a given channel. Thus, the transmitter may have access to (e.g., store) receiver device addresses 1032 and 1034 for different channels. In some aspects the device address 1022 comprises a device address associated with the transmitter 1000. In this case, the parameters 1004 for a given channel may be generated based on the addresses of the transmitter and the receiver(s) using that channel. Such a technique may increase the likelihood that the parameters for that channel are different than the parameters defined for any neighboring channels.

To further increase the likelihood that the parameters selected for a given channel are unique, a transmitter and a receiver may negotiate (or cooperate in some other manner) to select one or more seed parameters. For example, these components may select a channel identifier, generate a sequence number or generate a security key. In particular, the channel identifier may be used when more than one channel is defined by a given set of devices.

In some aspects an address selector 1062 (e.g., corresponding to selector 324) may use one or more of the seed parameters 1018 to obtain a shorter network address (source, destination, or both) to be used for a given channel. For example, as discussed above the address selector 1062 may derive a shorter network address based on the network address of a transmitter that will utilize the channel, the network address(es) of one or more receivers that will utilize the channel, or some combination of these network addresses. The shorter address may then be used to send data over the channel.

A pulse signal processor component 1036 (e.g., corresponding to signal processor 116) uses the channel definition parameters 1004 and other information to send data over the channel. For example, a timing controller 1038 may control when a pulse generator 1040 generates pulses based on the channel definition parameters 1004. In addition, in some implementations, the timing of the generated pulses may be based on one or more timeslot definitions 1042 representative of a timeslot structure defined for the channel.

In some aspects a data generator component 1044 generates pulse signals to be transmitted by combining (e.g., via a modulation scheme) the generated pulses and data 1046. For example, in some implementations the phase and/or the position of the pulse signals may be modulated according to the values of the data bits that are to be sent to a receiver. The resulting data pulses are then provided to an appropriate radio component 1048 that provides the data pulses to an antenna 1050 whereupon the data pulses are transmitted across the communication medium.

As discussed above, the data to be transmitted to a receiver may be formatted in various ways. For example, the transmitter may send data as individual data bits, data packets, streaming data, or in some other suitable form. Accordingly, the transmitter 1000 may include a data formatter/multiplexer 1052 or some other suitable mechanism for formatting the data to be transmitted. In some implementations, the timing of the transmitted data may be based on one or more timeslot definitions 1042 representative of a timeslot structure defined for the channel. In addition, the timing of the transmitted data may be based on one or more logical channel definitions 1054 defined for the channel. For example, the data for channel 2 ("CH2") may relate to two distinct data flows (designated CH2 DATA A and CH2 DATA B) that may then be transmitted over channel 2 via two logical channels.

The channel parameter selection operation and the data to be transmitted at any given time may depend on the current state of the channel. For example, during an inactive state the selector 1002 may select default channel definition parameters for a known channel. During a connected state the data formatter/multiplexer 1052 generate packet data for the channel. During a streaming state the data formatter/multiplexer 1052 may generate streaming data for the channel. Accordingly, the transmitter 1000 may include a state controller 1056 (e.g., corresponding to state controller 114) that may transition between states based on, for example, timing signals from one or more timers 1058, receive data 1060 (e.g., messages received via another channel), or some other suitable criteria. In some aspects the receive data 1060 may relate to the presence or absence of traffic on a channel, or messages received via a channel. As an example of the latter, the state controller 1056 may change state in conjunction with a paging procedure or a discovery procedure.

FIG. 10 also illustrates that a given device may support multiple concurrent channels. For example, based on corresponding sets of channel definition parameters 1004, a device may establish orthogonal or pseudo-orthogonal channels (e.g., channels 1 and 2) to enable concurrent transmission of the corresponding data (e.g., CH1 DATA and CH2 DATA) on the channels.

Figure 11:
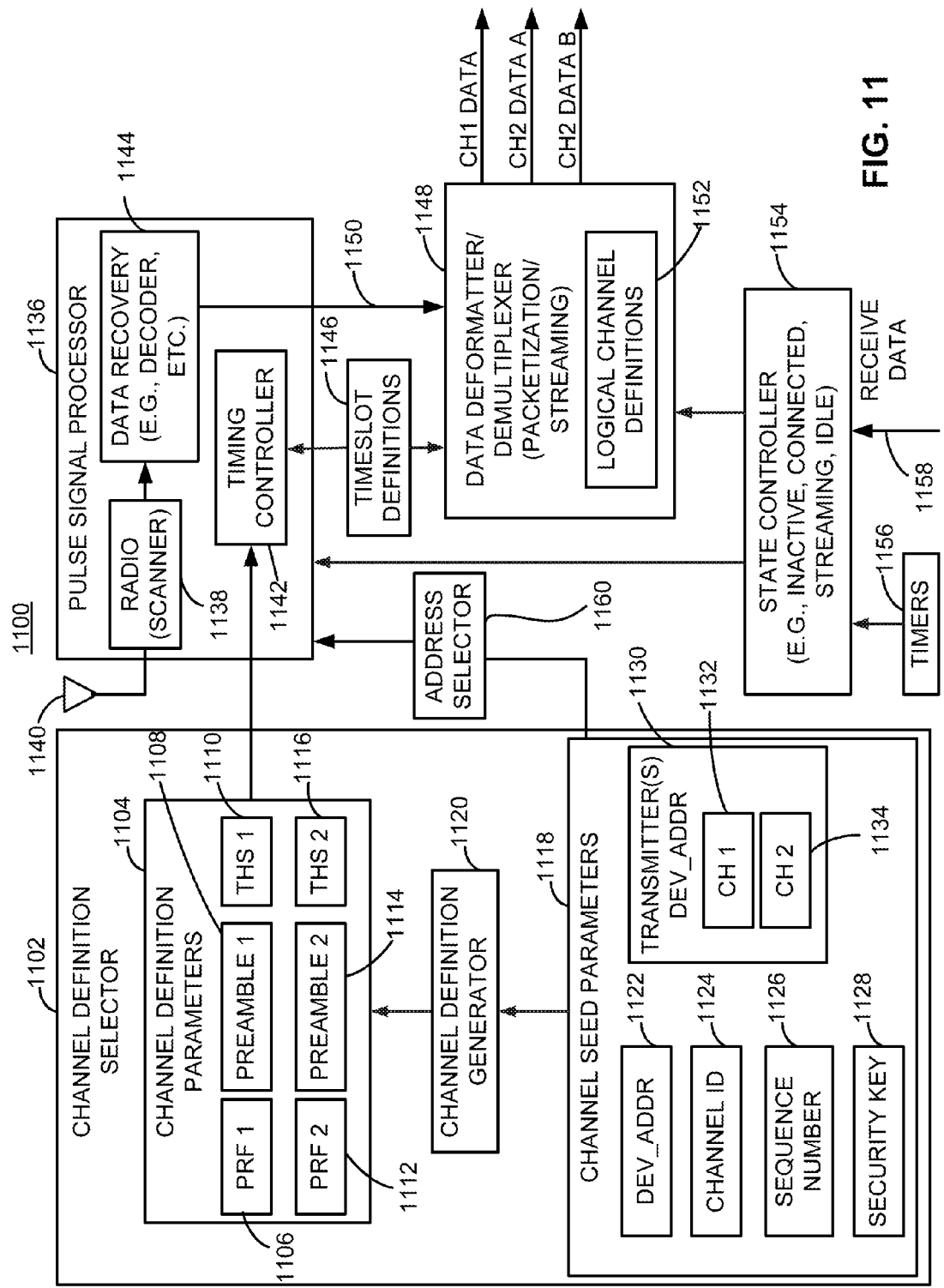
FIG. 11 is a simplified block diagram of several sample aspects of a receiver employing pulse signaling.

FIG. 11 illustrates several sample components that may be incorporated into a receiver 1100 that supports PDMA. In a similar manner as discussed above in conjunction with FIG. 10, a channel definition selector 1102 (e.g., corresponding to controller 112) may provide a signaling scheme (e.g., channel definition parameters 1104) for establishing one or more channels. Again, the channel definition parameters 1104 may include pulse repetition frequency parameters 1106, 1112, preamble sequences 1108, 1114, and time hopping sequences 1110, 1116, defined for one or more channels (e.g., a default channel "1" and a new channel "2"). In some aspects, the receiver 1100 may simply have access to (e.g., store) channel definition parameters provided by a transmitter. Alternatively, a receiver may employ components similar to those described above in conjunction with FIG. 10 (e.g., component 1120 and parameters 1118, 1124, 1126, and 1128) that may be used to derive one or more of the channel definition parameters 1104. In this case, the device address 1122 may correspond to the address of the receiver 1100 while device addresses 1130 may correspond to the addresses of transmitters associated with different channels (addresses 1132, 1134). As discussed above, the receiver 1100 may use one or more of the seed parameters 1118 when cooperating with a transmitter to define a channel.

An address selector 1160 (e.g., corresponding to address selector 324) may use one or more of the seed parameters 1118 (e.g., a network address of the transmitter 1000 or the receiver 1100) to obtain (e.g., derive) a shorter network address to be used for a given channel. In some aspects a transmitter may provide the shorter address to the receiver 1100. In some aspects the receiver 1100 may provide the shorter address to a transmitter. In some aspects the receiver 1100 may use the shorter address to identify transmissions destined for the receiver 1100.

A pulse signal processor component 1136 (e.g., corresponding to signal processor 116) uses the channel definition parameters 1104 and other information to identify transmissions destined for the receiver 1100 and to extract data from signals received from the corresponding channel. To this end the component 1136 includes a radio component 1138 (e.g., providing functionality similar to channel scanner 320) and an associated antenna 1140. Here, a timing controller 1142 may control, based on the channel definition parameters 1104, when a data recovery component 1144 decodes or otherwise extracts data from the received pulse signals. As discussed above, in some implementations the phase and/or the position of the pulse signals may be modulated according to the values of the data bits that are to be sent to a receiver. Accordingly, the data recovery component 1144 may include complementary functionality to recover (e.g., demodulate) data 1150 from the data pulses. In addition, in some implementations the timing of the data recovery operations may be based on one or more timeslot definitions 1146 representative of a timeslot structure defined for the channel.

As discussed above, the transmitter may send data as individual data bits, packets, streaming data, or in some other form. Accordingly, the receiver 1100 may include a data deformatter/demultiplexer 1148 or some other suitable mechanism for deformatting the received data 1150. Again, the timing of the data may be based on one or more timeslot definitions 1146 representative of a timeslot structure defined for the channel. In addition, the timing of the data may be based on one or more logical channel definitions 1152 defined for the channel. Thus, the data deformatter/demultiplexer 1148 may extract the logical channel data for channel 2 back into the two distinct flows (CH2 DATA A and CH2 DATA B).

Also as discussed above, the channel parameter selection operation and the data received at a given point time may depend on the current state of the channel. Again, during an inactive state the selector 1102 may select default channel definition parameters 1104 for the known channel. During a connected state the data deformatter/demultiplexer 1148 may depacketize the data 1150. During a streaming state the data deformatter/demultiplexer 1148 may recover a stream of data. The receiver 1100 thus includes a state controller 1154 (e.g., corresponding to state controller 114) that may transition between states based on, for example, timing signals from one or more timers 1156, receive data 1158, or some other suitable criteria. In some aspects the receive data 1158 may relate to the presence or absence of traffic on the channel, or messages received via the channel. As an example of the latter, the state controller 1154 may change state in response to a paging procedure or a discovery procedure.

Figure 12:
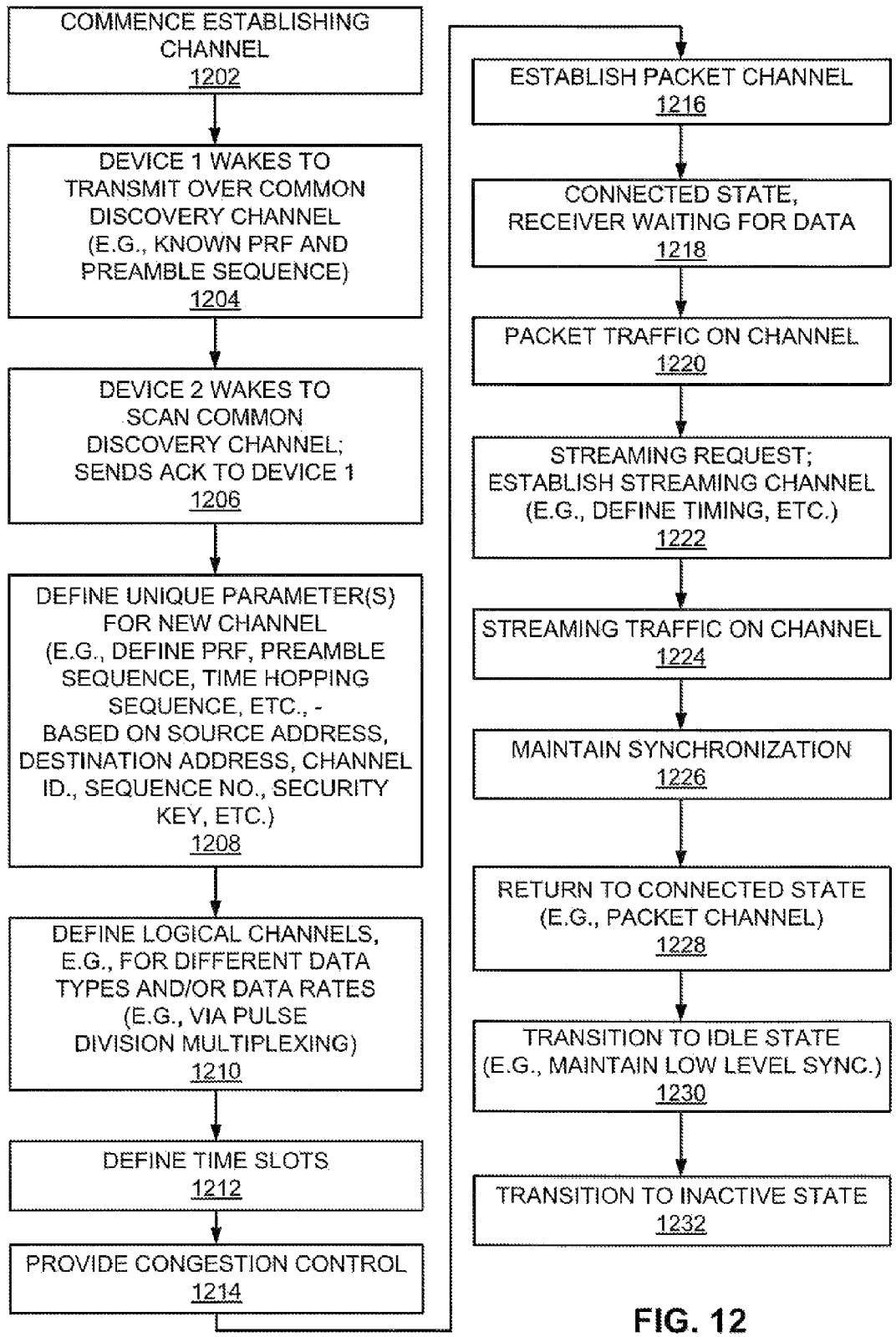
FIG. 12 is a flowchart of several sample aspects of operations that may be performed to establish and communicate via one or more channels using a pulse division multiple access scheme.

With the above description in mind, additional details of operations that may be performed in conjunction with a PDMA scheme will be treated in conjunction with the flowchart of FIG. 12. In particular, these sample operations relate to setting up a channel and performing various operations associated with the states of the channel.

As represented by block 1202, a transmitter (e.g., transmitter 1000) in a first device will commence establishment of a channel based on, for example, a request by an application executing on the wireless device that includes the transmitter. Accordingly, as represented by block 1204, the transmitter may wake from a power save state (e.g., an inactive state) to send messages (e.g., polling messages) over a known channel (e.g., a common discovery channel) to one or more receivers. Depending upon the requirements of a given application the message may request a response from any receiver that happens to be in the immediate vicinity of the transmitter or from a specific receiver or receivers. The latter case may occur when the transmitter has gained information about the receiver(s) via, for example, a prior association procedure. Also, the transmitter may repeatedly send the messages (e.g., at a known interval) in the event a response is not immediately received from the receiver(s).

As discussed above, the known channel may be defined by known channel parameters. In a typical implementation, these parameters may include a known pulse repetition frequency and a known preamble. In other implementations, other parameters such as a time hopping sequence or code spreading sequence may be defined for the known channel. In some implementations more than one known channel may be defined. Also, in some implementations a known channel may be defined for a given sub-network (e.g., a group of wireless device that are expected to be in communication at some point in time).

As represented by block 1206, a receiver in a second device may be configured to regularly (e.g., periodically) wake from a power save state to scan the known channel. The receiver may then send an acknowledgement ("ACK") to the transmitter via the same channel or a different channel.

As represented by block 1208, the transmitter and, optionally, the receiver may define the parameters for a new channel. As discussed above, this may be accomplished through the operations of the selector 1002 and/or the selector 11102. Moreover, the channel parameters may be based on one or more seed parameters such as a device address, etc.

As represented by blocks 1210, 1212, and 1214, the transmitter and, optionally, the receiver may define additional attributes of the channel. Specifically, one or more logical channels maybe defined for the channel (block 1210), a timeslot structure may be defined for the channel (block 1212), and some form of congestion control may be implemented in an attempt to reduce interference between neighboring channels (block 1214). These definitions are typically made when the channel is established. However, in some cases, an attribute (e.g., a logical channel) may be defined at some later point in time.

As represented by block 1216, in some implementations the transmitter and the receiver may initially set up the channel for packet traffic. For example, the transmitter may sent payload data encapsulated in a packet (e.g., with an appropriate header and error control information) that is preceded by a preamble associated with that channel. The error control information may include, for example, CRC covering the data bits in the packet. In addition, packet error rate may be managed by adopting an ARQ scheme.

Advantageously, this set up procedure may be performed when a channel is initially established or at some later point in time. Moreover, as discussed herein, a channel may be reconfigured to support other types of data traffic.

As represented by block 1218, the channel may at this point be in the connected state 906 discussed above. Thus, the receiver may continually scan the channel for packets sent by the transmitter (block 1220).

Packets may be sent back-to-back in a packet train such that a receiver acquires the channel at the first packet of the train and maintains pulse level synchronization until the last packet of the train. In this way, the relatively costly channel acquisition may occur only once, thereby resulting in a reduction in overhead that would otherwise be associated with repeatedly sending the preamble.

In some aspects a packet channel may be defined as a connectionless channel. For example, as discussed above a transmitter device and a receiver device may commence communication over a channel using known (e.g., default) channel parameters. Thus, the devices may establish communication over a channel without incurring the overhead associated with channel setup messages or other similar messages.

As represented by block 1222, at some point in time it may be desirable to send streaming data over the channel. Such a reconfiguration may be initiated, for example, by the transmitter sending a streaming request (e.g., a channel setup message) to the receiver via a packet on the packet channel. In response to this request, the transmitter and the receiver may cooperate to establish a streaming channel over the channel. For example, these components may define the timing of the streaming channel, the types of data to be transmitted over the channel, any synchronization that may be employed, timeout intervals, timeslot times, timeslot size, or any other suitable characteristic of the streaming channel.

In some aspects, the streaming channel may be concurrently established with the packet channel. For example, the packet channel may not be completely torn down at block 1222. Rather, as will be discussed herein, the transmitter and the receiver may seamlessly transition between the packet channel and the streaming channel whenever necessary.

Once the streaming channel is established the transmitter may send streaming data to the receiver (block 1224). At this point the channel may be in the streaming state 908 discussed above. The data sent during the streaming state may take the form of, for example, a bit stream, packet data, or some other type of data flow. In addition, the pulse repetition frequency of the channel may be adjusted dynamically to adjust to a desired data rate.

The streaming channel may be bi-directional, comprising a coupled forward channel and reverse channel. Through such coupling, the two sub-channels share the timing of a single streaming channel. For example, pulse positions of the streaming channel may be assigned alternatively to the forward channel and the reverse channel, such that the relative data rate of the two sub-channels is 1:1. Another example of assignment allows the forward channel to use more pulse positions, e.g., resulting in a 3:1 data rate ratio. The use of coupled channels may be used to provide a relatively low latency between streaming channels in the same frequency band.

A streaming channel may be a receiving-and-forwarding channel, comprising a receiving channel from a first node to a second node, and a forwarding channel from the second node to a third node. In this way data may be transferred over multiple hops. The two sub-channels are coupled and share the pulse positions of a single stream channel. Hence, this type of channel provides a pulse-level store-and-forward mechanism.

During the streaming state the transmitter and the receiver may takes steps to maintain synchronization with respect to the streaming channel (block 1226). For example, the transmitter may send synchronization information (e.g., a preamble and/or timing information) to the receiver at regular (e.g., periodic) intervals regardless of whether there is any data to be sent over the streaming channel. Similar information also may be sent to acquire a channel upon receiving or not receiving periodic acknowledgements from a receiver. During periods without streaming data, however, the duty cycle may be decreased to a lower level to reduce power while still maintaining some level of synchronization.

At some point in time the channel may be reconfigured back to the packet channel (block 1228). This transition may be initiated, for example, in response to an explicit request sent over the streaming channel or, automatically, due to a lack of streaming data for a specified period of time (e.g., a timeout after several milliseconds of inactivity). Thus, at this point the channel may return to the connected state 906.

At some point in time the channel may revert to the idle state 904 (block 1230). This may occur, for example, in response to an explicit request sent over the packet channel or, automatically, due to a lack of packet data for a specified period of time (e.g., a timeout after several seconds of inactivity). In this state, the transmitter may maintain relatively low level synchronization. For example, the transmitter may wake occasionally to send synchronization information over the channel. Similarly, the receiver may wake occasionally to scan the channel for the synchronization information, polling messages or other messages.

As represented by block 1232, at some point in time the channel may revert to the inactive state 902. Again, this may occur in response to an explicit request or, automatically, due to a lack of data for a specified period of time (e.g., a timeout after a day, week, etc., of inactivity). In this lower duty cycle state, the receiver may, for example wake occasionally to scan the channel for polling messages or other types of messages.

The teachings herein may be incorporated into a variety of devices. For example, one or more aspects taught herein may be incorporated into a phone (e.g., a cellular phone), a personal data assistant ("PDA"), an entertainment device (e.g., a music or video device), a headset, a microphone, a biometric sensor (e.g., a heart rate monitor, a pedometer, an EKG device, a keyboard, a mouse, etc.), a user I/O device (e.g., a watch, a remote control, a light switch, etc.) or any other suitable device. Moreover, these devices may have different power and data requirements. Advantageously, the teachings herein may be adapted for use in low power applications (e.g., through the use of a pulse-based signaling scheme and low duty cycle modes) and may support a variety of data rates including relatively high data rates (e.g., through the use of high-bandwidth pulses).

In some aspects two or more of these devices may independently establish communication with one another to exchange various types of information. For example, a user may carry several of these devices (e.g., a watch, a cell phone, and a headset) wherein data received by one device may be provided to another device for more effective presentation to the user.

Figure 13:
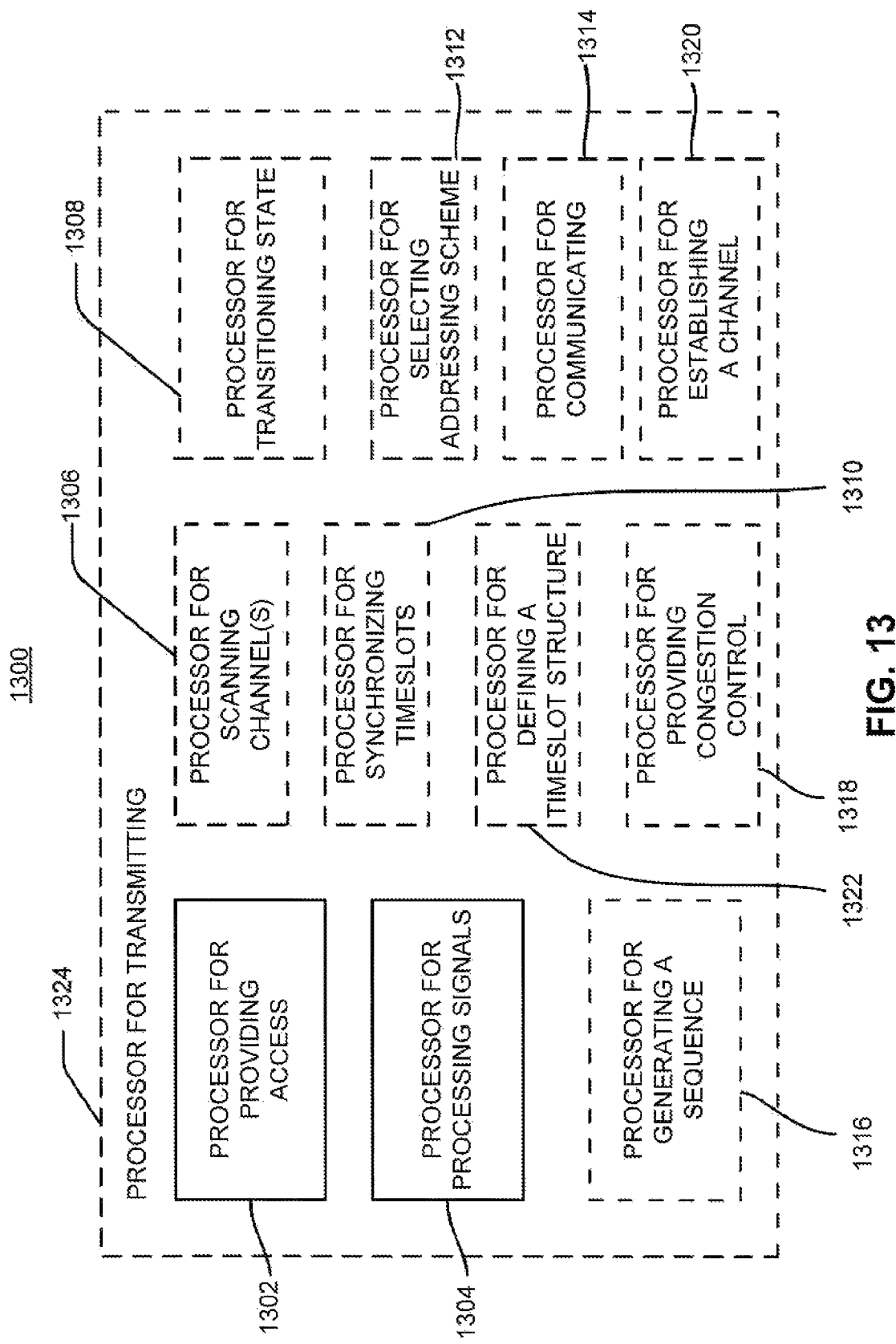
FIG. 13 is a simplified block diagram of several sample aspects of an apparatus adapted to support concurrent ultra-wide band channels.
Figure 14:
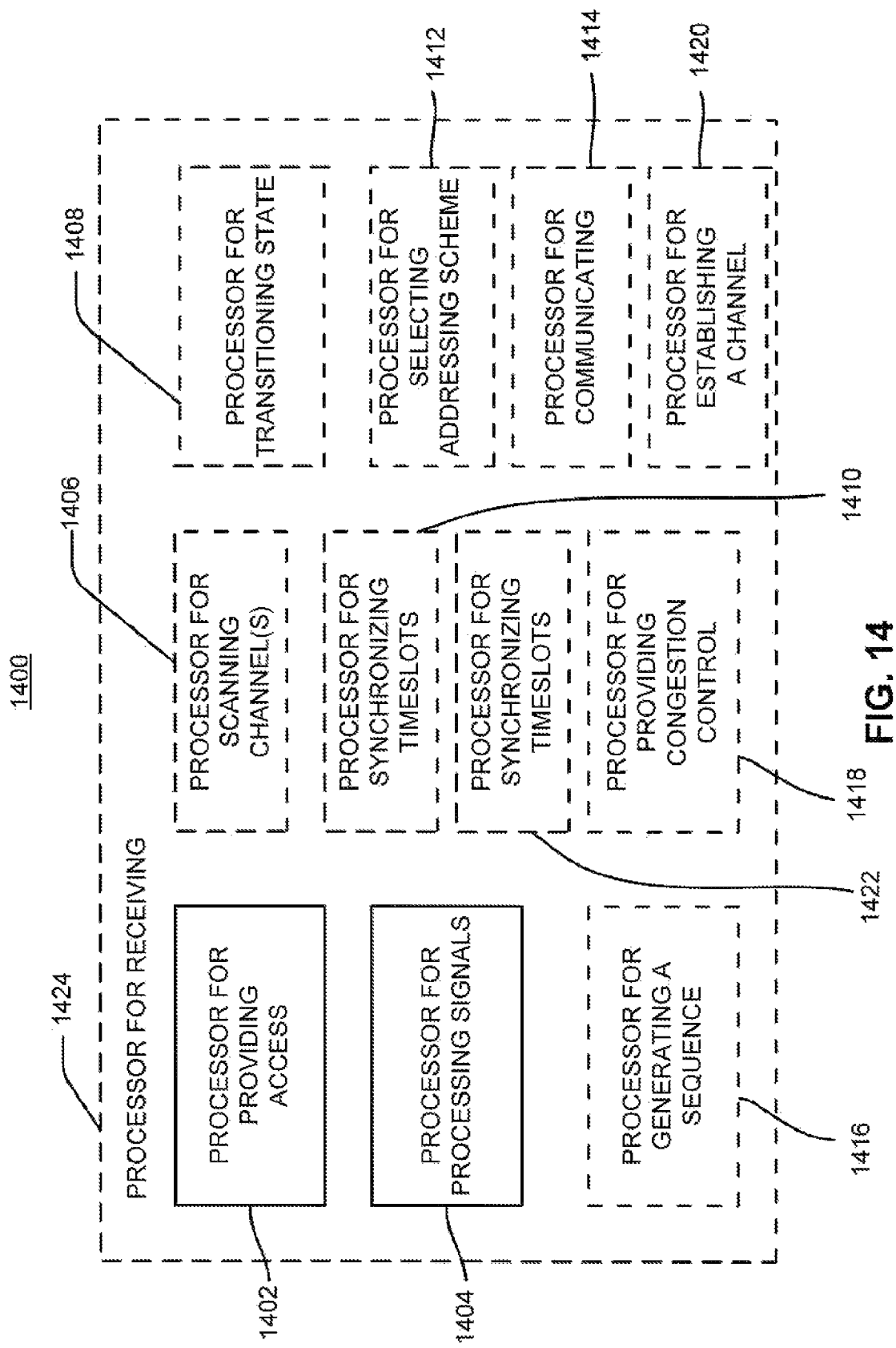
FIG. 14 is a simplified block diagram of several sample aspects of an apparatus adapted to support concurrent ultra-wide band channels.

The components described herein may be implemented in a variety of ways. For example, referring to FIG. 13, an apparatus 1300 includes components 1302, 1304, 1306, 1308, 1310, 1312, 1314, 1316, 1318, 1320, and 1322 that may correspond to, for example, previously discussed components 108, 116, 320, 114, 330, 324, 326, 328, 334, 318, and 318, respectively. In some aspects these components may be incorporated in a component 1324 that may correspond to, for example, component 1000 in FIG. 10. In FIG. 14 an apparatus 1400 includes similar components 1402, 1404, 1406, 1408, 1410, 1412, 1414, 1416, 1418, 1420, and 1422. In some aspects these components may be incorporated in a component 1424 that may correspond to, for example, component 1100 in FIG. 11. FIGS. 13 and 14 illustrate that in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

In addition, the components and functions represented by FIGS. 13 and 14, as well as other components and functions described herein, may be implemented using any suitable means. Such means also may be implemented, at least in part, using corresponding structure as taught herein. For example, in some aspects means for transmitting may comprise a transmitter, means for receiving may comprise a receiver, means for providing access may comprise a media access controller, means for processing signaling may comprise a signal processor, means for establishing a channel may comprise a channel establisher, means for scanning channel(s) may comprise a channel scanner, means for generating a sequence may comprise a sequence generator, means for selecting an addressing scheme may comprise an address selector, means for communicating may comprise a communication module, means for synchronizing timeslots may comprise a timeslot synchronizer, means for transitioning state may comprise a state controller, means for providing congestion control may comprise a congestion controller. One or more of such means also may be implemented in accordance with one or more of the processor components of FIGS. 13 and 14.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A media access control method, comprising:
   providing access via peer-to-peer media access control that is configured to establish concurrent first and second ultra-wide band channels, wherein the first ultra-wide band channel is defined by substantially periodic pulses having first constant pulse-to-pulse delays, wherein the second ultra-wide band channel is defined by substantially periodic pulses having second constant pulse-to-pulse delays, the first constant pulse-to-pulse delays being different than the second constant pulse-to-pulse delays, wherein substantially all pulses of the first ultra-wide band channel are transmitted at different times than pulses of the second ultra-wide band channel; and
processing signals associated with at least one of the first and second ultra-wide band channels.

2. The method of claim 1, wherein at least one of the first and second ultra-wide band channels is established based on at least one of the group consisting of: a preamble sequence, and a time hopping sequence.

3. The method of claim 2, wherein at least one of the preamble sequence and the time hopping sequence is defined based on at least one of the group consisting of: a transmitter device address, a receiver device address, a channel identifier, a sequence number, and a security key.

4. The method of claim 1, wherein a timeslot structure is defined for at least one of the first and second ultra-wide band channels.

5. The method of claim 1, wherein at least one of the first and second ultra-wide band channels is defined as a packet channel, a streaming channel, or a packet channel and a streaming channel.

6. The method of claim 1, wherein a plurality of pulse division multiplexed logical channels are defined for at least one of the first and second ultra-wide band channels.

7. The method of claim 1, wherein the peer-to-peer media access control has a functionality that is substantially similar to other media access control functionality for all other devices communicating via the first and second ultra-wide band channels.

8. The method of claim 7, wherein the peer-to-peer media access control independently provides channel access for one of the first and second ultra-wide band channels, without taking into account an access scheme for the other one of the first and second ultra-wide band channels.

9. The method of claim 7, wherein the media access control functionality comprises a standby state and an active state, the method further comprising:
scanning, in the standby state, at least one of the first and second ultra-wide band channels at a low duty cycle; and
scanning, in the active state, at least one of the first and second ultra-wide band channels at a duty cycle that is higher than the low duty cycle.

10. The method of claim 9, wherein the active state is a connectionless state.

11. The method of claim 9, further comprising transitioning from the standby state to the active state in response to a discovery procedure or a paging procedure.

12. The method of claim 7, wherein an addressing scheme for at least one of the first and second ultra-wide band channels is defined based on at least one of the group consisting of: an address of one of the devices, a shorter network address associated with one of the devices, and a channel parameter.

13. The method of claim 12, wherein the channel parameter comprises at least one of the group consisting of: a pulse repetition frequency, a preamble sequence, and a time hopping sequence.

14. The method of claim 7, further comprising communicating that:
a shorter network address is to be used for accessing at least one of the first and second ultra-wide band channels; or
a network address is not to be used for accessing at least one of the first and second ultra-wide band channels.

15. The method of claim 14, wherein the shorter network address is based on a transmitter address, a receiver address, or transmitter and receiver addresses.

16. The method of claim 7, wherein each of the first and second ultra-wide band channels is established based on at least one of the group consisting of: a preamble sequence, and a time hopping sequence.

17. The method of claim 7, further comprising:
defining a timeslot structure for at least one of the first and second ultra-wide band channels; and
synchronizing, at a timeslot level, communication over at least one of the first and second ultra-wide band channels.

18. The method of claim 1, wherein the method is performed in a transmitter.

19. The method of claim 1, wherein the method is performed in a receiver.

20. The method of claim 1, wherein each of the first and second ultra-wide band channels has a fractional bandwidth on the order of 20% or more, has a bandwidth on the order of 500 MHz or more, or has a fractional bandwidth on the order of 20% or more and has a bandwidth on the order of 500 MHz or more.

21. The method of claim 1, wherein the first and second constant pulse-to-pulse delays are based on data rates of data communicated via the concurrent first and second ultra-wide band channels, respectively.

22. A media access control apparatus, comprising:
a peer-to-peer media access controller adapted to establish concurrent first and second ultra-wide band channels, wherein the first ultra-wide band channel is defined by substantially periodic pulses having first constant pulse-to-pulse delays, wherein the second ultra-wide band channel is defined by substantially periodic pulses having second constant pulse-to-pulse delays, the first constant pulse-to-pulse delays being different than the second constant pulse-to-pulse delays, wherein substantially all pulses of the first ultra-wide band channel are transmitted at different times than pulses of the second ultra-wide band channel; and
a signal processor adapted to process signals associated with at least one of the first and second ultra-wide band channels.

23. The apparatus of claim 22, wherein at least one of the first and second ultra-wide band channels is established based on at least one of the group consisting of: a preamble sequence, and a time hopping sequence.

24. The apparatus of claim 23, wherein at least one of the preamble sequence and the time hopping sequence is defined based on at least one of the group consisting of: a transmitter device address, a receiver device address, a channel identifier, a sequence number, and a security key.

25. The apparatus of claim 22, wherein a timeslot structure is defined for at least one of the first and second ultra-wide band channels.

26. The apparatus of claim 22, wherein at least one of the first and second ultra-wide band channels is defined as a packet channel, a streaming channel, or a packet channel and a streaming channel.

27. The apparatus of claim 22, wherein a plurality of pulse division multiplexed logical channels are defined for at least one of the first and second ultra-wide band channels.

28. The apparatus of claim 22, wherein the peer-to-peer media access controller is adapted to have a functionality that is substantially similar to other media access control functionality for all other devices communicating via the first and second ultra-wide band channels.

29. The apparatus of claim 28, wherein the media access controller is adapted to independently provide channel access for one of the first and second ultra-wide band channels, without taking into account an access scheme for the other one of the first and second ultra-wide band channels.

30. The apparatus of claim 28, wherein the media access control functionality comprises a standby state and an active state defined by a state controller, the apparatus further comprising:
- a channel scanner adapted to scan, in the standby state, at least one of the first and second ultra-wide band channels at a low duty cycle; and
- a channel scanner adapted to scan, in the active state, at least one of the first and second ultra-wide band channels at a duty cycle that is higher than the low duty cycle.

31. The apparatus of claim 30, wherein the active state is a connectionless state.

32. The apparatus of claim 30, wherein the state controller is adapted to transition from the standby state to the active state in response to a discovery procedure or a paging procedure.

33. The apparatus of claim 28, further comprising an addressing scheme selector adapted to define an addressing scheme for at least one of the first and second ultra-wide band channels based on at least one of the group consisting of: an address of one of the devices, a shorter network address associated with one of the devices, and a channel parameter.

34. The apparatus of claim 33, wherein the channel parameter comprises at least one of the group consisting of: a pulse repetition frequency, a preamble sequence, and a time hopping sequence.

35. The apparatus of claim 28, further comprising an addressing scheme selector adapted to communicate that:
- a shorter network address is to be used for accessing at least one of the first and second ultra-wide band channels; or
- a network address is not to be used for accessing at least one of the first and second ultra-wide band channels.

36. The apparatus of claim 35, wherein the addressing scheme selector derives the shorter network address based on a transmitter address, a receiver address, or transmitter and receiver addresses.

37. The apparatus of claim 28, further comprising a channel establisher adapted to define the first and second ultra-wide band channels based on at least one of the group consisting of: a preamble sequence, and a time hopping sequence.

38. The apparatus of claim 28, further comprising:
- a channel establisher adapted to define a timeslot structure for at least one of the first and second ultra-wide band channels; and
- a synchronizer adapted to synchronize, at a timeslot level, communication over at least one of the first and second ultra-wide band channels.

39. The apparatus of claim 22, wherein the apparatus is implemented in a transmitter.

40. The apparatus of claim 22, wherein the apparatus is implemented in a receiver.

41. The apparatus of claim 22, wherein each of the first and second ultra-wide band channels has a fractional bandwidth on the order of 20% or more, has a bandwidth on the order of 500 MHz or more, or has a fractional bandwidth on the order of 20% or more and has a bandwidth on the order of 500 MHz or more.

42. The apparatus of claim 22, wherein the first and second constant pulse-to-pulse delays are based on data rates of data communicated via the concurrent first and second ultra-wide band channels, respectively.

43. A media access control apparatus, comprising:
- means for providing access via peer-to-peer media access control that is configured to establish concurrent first and second ultra-wide band channels, wherein the first ultra-wide band channel is defined by substantially periodic pulses having first constant pulse-to-pulse delays, wherein the second ultra-wide band channel is defined by substantially periodic pulses having second constant pulse-to-pulse delays, the first constant pulse-to-pulse delays being different than the second constant pulse-to-pulse delays, wherein substantially all pulses of the first ultra-wide band channel are transmitted at different times than pulses of the second ultra-wide band channel; and
- means for processing signals associated with at least one of the first and second ultra-wide band channels.

44. The apparatus of claim 43, wherein at least one of the first and second ultra-wide band channels is established based on at least one of the group consisting of: a preamble sequence, and a time hopping sequence.

45. The apparatus of claim 44, wherein at least one of the preamble sequence and the time hopping sequence is defined based on at least one of the group consisting of: a transmitter device address, a receiver device address, a channel identifier, a sequence number, and a security key.

46. The apparatus of claim 43, wherein a timeslot structure is defined for at least one of the first and second ultra-wide band channels.

47. The apparatus of claim 43, wherein at least one of the first and second ultra-wide band channels is defined as a packet channel, a streaming channel, or a packet channel and a streaming channel.

48. The apparatus of claim 43, wherein a plurality of pulse division multiplexed logical channels are defined for at least one of the first and second ultra-wide band channels.

49. The apparatus of claim 43, wherein the means for providing access has a functionality that is substantially similar to other media access control functionality for all other devices communicating via the first and second ultra-wide band channels.

50. The apparatus of claim 49, wherein the means for providing access independently provides channel access for one of the first and second ultra-wide band channels, without taking into account an access scheme for the other one of the first and second ultra-wide band channels.

51. The apparatus of claim 49, wherein the media access control functionality comprises a standby state and an active state, the apparatus further comprising:
- means for scanning, in the standby state, at least one of the first and second ultra-wide band channels at a low duty cycle; and
- means for scanning, in the active state, at least one of the first and second ultra-wide band channels at a duty cycle that is higher than the low duty cycle.

52. The apparatus of claim 51, wherein the active state is a connectionless state.

53. The apparatus of claim 51, further comprising means for transitioning from the standby state to the active state in response to a discovery procedure or a paging procedure.

54. The apparatus of claim 49, wherein an addressing scheme for at least one of the first and second ultra-wide band channels is defined based on at least one of the group consisting of: an address of one of the devices, a shorter network address associated with one of the devices, and a channel parameter.

55. The apparatus of claim 54, wherein the channel parameter comprises at least one of the group consisting of: a pulse repetition frequency, a preamble sequence, and a time hopping sequence.

56. The apparatus of claim 49, further comprising means for communicating that:
- a shorter network address is to be used for accessing at least one of the first and second ultra-wide band channels; or
- a network address is not to be used for accessing at least one of the first and second ultra-wide band channels.

57. The apparatus of claim 56, wherein the shorter network address is based on a transmitter address, a receiver address, or transmitter and receiver addresses.

58. The apparatus of claim 49, wherein each of the first and second ultra-wide band channels is established based on at least one of the group consisting of: a preamble sequence, and a time hopping sequence.

59. The apparatus of claim 49, further comprising:
- means for defining a timeslot structure for at least one of the first and second ultra-wide band channels; and
- means for synchronizing, at a timeslot level, communication over at least one of the first and second ultra-wide band channels.

60. The apparatus of claim 43, wherein the apparatus is implemented in a means for transmitting.

61. The apparatus of claim 43, wherein the apparatus is implemented in a means for receiving.

62. The apparatus of claim 43, wherein each of the first and second ultra-wide band channels has a fractional bandwidth on the order of 20% or more, has a bandwidth on the order of 500 MHz or more, or has a fractional bandwidth on the order of 20% or more and has a bandwidth on the order of 500 MHz or more.

63. The apparatus of claim 43, wherein the first and second constant pulse-to-pulse delays are based on data rates of data communicated via the concurrent first and second ultra-wide band channels, respectively.

64. A media access control computer-program product comprising:
- a computer-readable medium comprising codes for causing at least one computer to:
  - provide access via peer-to-peer media access control that is configured to establish concurrent first and second ultra-wide band channels, wherein the first ultra-wide band channel is defined by substantially periodic pulses having first constant pulse-to-pulse delays, wherein the second ultra-wide band channel is defined by substantially periodic pulses having second constant pulse-to-pulse delays, the first constant pulse-to-pulse delays being different than the second constant pulse-to-pulse delays, wherein substantially all pulses of the first ultra-wide band channel are transmitted at different times than pulses of the second ultra-wide band channel; and
  - process signals associated with at least one of the first and second ultra-wide band channels.

65. A headset, comprising:
- a transducer adapted to generate audio data;
- a peer-to-peer media access controller adapted to establish concurrent first and second ultra-wide band channels, wherein the first ultra-wide band channel is defined by substantially periodic pulses having first constant pulse-to-pulse delays, wherein the second ultra-wide band channel is defined by substantially periodic pulses having second constant pulse-to-pulse delays, the first constant pulse-to-pulse delays being different than the second constant pulse-to-pulse delays, wherein substantially all pulses of the first ultra-wide band channel are transmitted at different times than pulses of the second ultra-wide band channel; and
- a signal processor adapted to process signals associated with at least one of the first and second ultra-wide band channels, wherein the signals comprise the audio data.

66. A watch, comprising:
- a user interface adapted to generate data;
- a peer-to-peer media access controller adapted to establish concurrent first and second ultra-wide band channels, wherein the first ultra-wide band channel is defined by substantially periodic pulses having first constant pulse-to-pulse delays, wherein the second ultra-wide band channel is defined by substantially periodic pulses having second constant pulse-to-pulse delays, the first constant pulse-to-pulse delays being different than the second constant pulse-to-pulse delays, wherein substantially all pulses of the first ultra-wide band channel are transmitted at different times than pulses of the second ultra-wide band channel; and
- a signal processor adapted to process signals associated with at least one of the first and second ultra-wide band channels, wherein the signals comprise the data.

67. A sensing device, comprising:
- a sensor adapted to generate data;
- a peer-to-peer media access controller adapted to establish concurrent first and second ultra-wide band channels, wherein the first ultra-wide band channel is defined by substantially periodic pulses having first constant pulse-to-pulse delays, wherein the second ultra-wide band channel is defined by substantially periodic pulses having second constant pulse-to-pulse delays, the first constant pulse-to-pulse delays being different than the second constant pulse-to-pulse delays, wherein substantially all pulses of the first ultra-wide band channel are transmitted at different times than pulses of the second ultra-wide band channel; and
- a signal processor adapted to process signals associated with at least one of the first and second ultra-wide band channels, wherein the signals comprise the data.

* * * * *